(12) United States Patent
Miyazaki et al.

(10) Patent No.: US 12,231,235 B2
(45) Date of Patent: Feb. 18, 2025

(54) COMMUNICATION DEVICE, COMMUNICATION METHOD, AND PROGRAM

(71) Applicant: Sony Semiconductor Solutions Corporation, Kanagawa (JP)

(72) Inventors: Soichiro Miyazaki, Kanagawa (JP); Hiroo Takahashi, Kanagawa (JP); Toshihisa Hyakudai, San Diego, CA (US)

(73) Assignee: Sony Semiconductor Solutions Corporation, Kanagawa (JP)

( * ) Notice: Subject to any disclaimer, the term of this patent is extended or adjusted under 35 U.S.C. 154(b) by 421 days.

(21) Appl. No.: 17/616,812

(22) PCT Filed: Jun. 3, 2020

(86) PCT No.: PCT/JP2020/021971
§ 371 (c)(1),
(2) Date: Dec. 6, 2021

(87) PCT Pub. No.: WO2020/250778
PCT Pub. Date: Dec. 17, 2020

(65) Prior Publication Data
US 2022/0303056 A1   Sep. 22, 2022

(30) Foreign Application Priority Data
Jun. 14, 2019 (JP) ................... 2019-111476

(51) Int. Cl.
*H04L 1/08* (2006.01)
*H04L 1/1607* (2023.01)
(Continued)

(52) U.S. Cl.
CPC .............. *H04L 1/08* (2013.01); *H04L 1/1642* (2013.01); *H04L 1/203* (2013.01); *H04L 5/0044* (2013.01); *H04L 5/0078* (2013.01)

(58) Field of Classification Search
None
See application file for complete search history.

(56) References Cited

U.S. PATENT DOCUMENTS 5,210,751 A * 5/1993 Onoe .................... H04L 1/1809
370/349
5,918,002 A   6/1999 Klemets
(Continued)

FOREIGN PATENT DOCUMENTS

CN   1339749 A   3/2002
CN   101502033 A   8/2009
(Continued)

OTHER PUBLICATIONS

International Search Report (PCT/ISA/210), International Application No. PCT/JP2020/021971, dated Jul. 21, 2020.
(Continued)

*Primary Examiner* — Alpus Hsu
*Assistant Examiner* — Camquyen Thai
(74) *Attorney, Agent, or Firm* — Michael Best & Friedrich LLP

(57) ABSTRACT

The present disclosure relates to a communication device, a communication method, and a program that make it possible to provide higher communication quality.
A retransmission detection unit acquires a message count included in a header of a packet transmitted from a communication device on a transmission side via a data channel, and detects the message count of the packet that is a candidate for which retransmission is requested as a retransmission candidate message count, and a retransmission
(Continued)

request unit generates retransmission request data for requesting retransmission of the packet held to be enabled to be transmitted by the communication device on the transmission side among a plurality of the packets with the retransmission candidate message count. The present technology can be applied to, for example, a communication system mounted on a vehicle.

8 Claims, 26 Drawing Sheets

(51) Int. Cl.
*H04L 1/20* (2006.01)
*H04L 5/00* (2006.01)

(56) References Cited

U.S. PATENT DOCUMENTS

| | | | |
|---|---|---|---|
| 6,233,251 | B1 | 5/2001 | Kurobe |
| 6,389,016 | B1* | 5/2002 | Sabaa .................. H04L 1/1635 370/231 |
| 9,490,850 | B1* | 11/2016 | Paniconi .................. H04L 1/18 |
| 2006/0245428 | A1 | 11/2006 | Yanamoto |
| 2006/0291468 | A1* | 12/2006 | Bopardikar ........... H04L 65/612 370/392 |
| 2014/0269731 | A1* | 9/2014 | DeCusatis ............. H04L 49/506 370/394 |

FOREIGN PATENT DOCUMENTS

| | | |
|---|---|---|
| CN | 101542957 A | 9/2009 |
| CN | 101594220 A | 12/2009 |
| JP | H03175840 A | 7/1991 |
| JP | H0537564 A | 2/1993 |
| JP | 10-262015 A | 9/1998 |
| JP | H11215192 A | 8/1999 |
| JP | 2000-188609 A | 7/2000 |
| JP | 2001007826 A | 1/2001 |
| JP | 2005-39726 A | 2/2005 |
| JP | 2017-211864 A | 11/2017 |
| WO | 2005/096523 A1 | 10/2005 |
| WO | WO-2011145557 A1 | 11/2011 |
| WO | WO-2015002371 A1 | 1/2015 |

OTHER PUBLICATIONS

Xu Wenbo et al., "RATCHETA: Memory-Bounded Hybrid Byzantine Consensus for Cooperative Embedded Systems", 2018 IEEE 37th Symposium on Reliable Distributed Systems (SRDS), Jan. 17, 2019, pp. 103-112.

Wu Xiaodan et al, "Research and Implementation of Stream-Path Binded CMT", China Master's Theses Database, Aug. 15, 2008, 78 pgs.

Ye Wenfang et al, "Design of Data Update System Based on Elastic Compute Branch Service", Nov. 17, 2016, Video Engineering, No. 11, Tianjin China, pp. 25-29.

Ye Wenfang; Pan Guofeng; Hua Zhong; Qi Jingai;, Design and Implementation of Data Updating System Based on Cloud Branch Server television technology,, No. 11, Nov. 17, 2016.

* cited by examiner

COMMUNICATION DEVICE, COMMUNICATION METHOD, AND PROGRAM

TECHNICAL FIELD

The present disclosure relates to a communication device, a communication method, and a program, and more particularly, to a communication device, a communication method, and a program enabled to provide higher communication quality.

BACKGROUND ART

In recent years, to implement an automatic driving technology for a vehicle, various sensors are mounted on the vehicle, such as an image sensor such as a complementary metal oxide semiconductor (CMOS) image sensor (CIS), and a distance sensor using time of flight (TOF). Then, it has been studied to use a camera serial interface (CSI)-2 standard for communication between these sensors and an application processor (AP).

Furthermore, in Patent Document 1, a system is devised that can reduce the number of data buses when a processing device and a plurality of image sensors are connected together using the CSI-2 standard.

CITATION LIST

Patent Document

Patent Document 1: Japanese Patent Application Laid-Open No. 2017-211864

SUMMARY OF THE INVENTION

Problems to be Solved by the Invention

However, in the existing CSI-2 standard, for example, in a case where a communication error occurs in a part of a packet transmitting an image, an entire one frame including the packet is retransmitted or the one frame including the packet is lost, and there is a concern that the communication quality is degraded.

The present disclosure has been made in view of such a situation, and makes it possible to provide higher communication quality.

Solutions to Problems

A communication device according to a first aspect of the present disclosure includes: a retransmission detection unit that acquires a message count included in a header of a packet transmitted from a communication device on a transmission side via a data channel, and detects the message count of the packet that is a candidate for which retransmission is requested as a retransmission candidate message count; and a retransmission request unit that generates retransmission request data for requesting retransmission of the packet held to be enabled to be transmitted by the communication device on the transmission side among a plurality of the packets with the retransmission candidate message count.

A communication method or a program according to a first aspect of the present disclosure includes: acquiring a message count included in a header of a packet transmitted from a communication device on a transmission side via a data channel, and detecting the message count of the packet that is a candidate for which retransmission is requested as a retransmission candidate message count; and generating retransmission request data for requesting retransmission of the packet held to be enabled to be transmitted by the communication device on the transmission side among a plurality of the packets with the retransmission candidate message count.

In the first aspect of the present disclosure, a message count is acquired that is included in a header of a packet transmitted from a communication device on a transmission side via a data channel, the message count of the packet that is a candidate for which retransmission is requested is detected as a retransmission candidate message count, and retransmission request data is generated for requesting retransmission of the packet held to be enabled to be transmitted by the communication device on the transmission side among a plurality of the packets of the retransmission candidate message count.

A communication device according to a second aspect of the present disclosure includes: a control data identification unit that identifies control data transmitted from a communication device on a reception side via a control channel, and detects retransmission request data specifying a packet for which retransmission is requested among a plurality or the packets transmitted to the communication device on the reception side via a data channel by a message count included in a header of the packet; and a transmission scheduler that controls switching between transmission of the packet for which retransmission is requested by the retransmission request data and transmission of the packet to be newly transmitted to the communication device on the reception side.

A communication method or a program according to a second aspect of the present disclosure includes: identifying control data transmitted from a communication device on a reception side via a control channel, and detecting retransmission request data specifying a packet for which retransmission is requested among a plurality of the packets transmitted to the communication device on the reception side via a data channel by a message count included in a header of the packet; and controlling switching between transmission of the packet for which retransmission is requested by the retransmission request data and transmission of the packet to be newly transmitted to the communication device on the reception side.

In the second aspect of the present disclosure, control data is identified that is transmitted from a communication device on a reception side via a control channel, retransmission request data is detected that specifies a packet for which retransmission is requested among a plurality of the packets transmitted to the communication device on the reception side via a data channel by a message count included in a header of the packet, and switching is controlled between transmission of the packet for which retransmission is requested by the retransmission request data and transmission of the packet to be newly transmitted to the communication device on the reception side.

MODE FOR CARRYING OUT THE INVENTION

Hereinafter, a specific embodiment to which the present technology is applied will be described in detail with reference to the drawings.

<Configuration Example of Communication System>

First, with reference to FIG. 1, a description will be given of a configuration example of an embodiment in which a communication system to which the present technology is applied is mounted on a vehicle.

Figure 1:
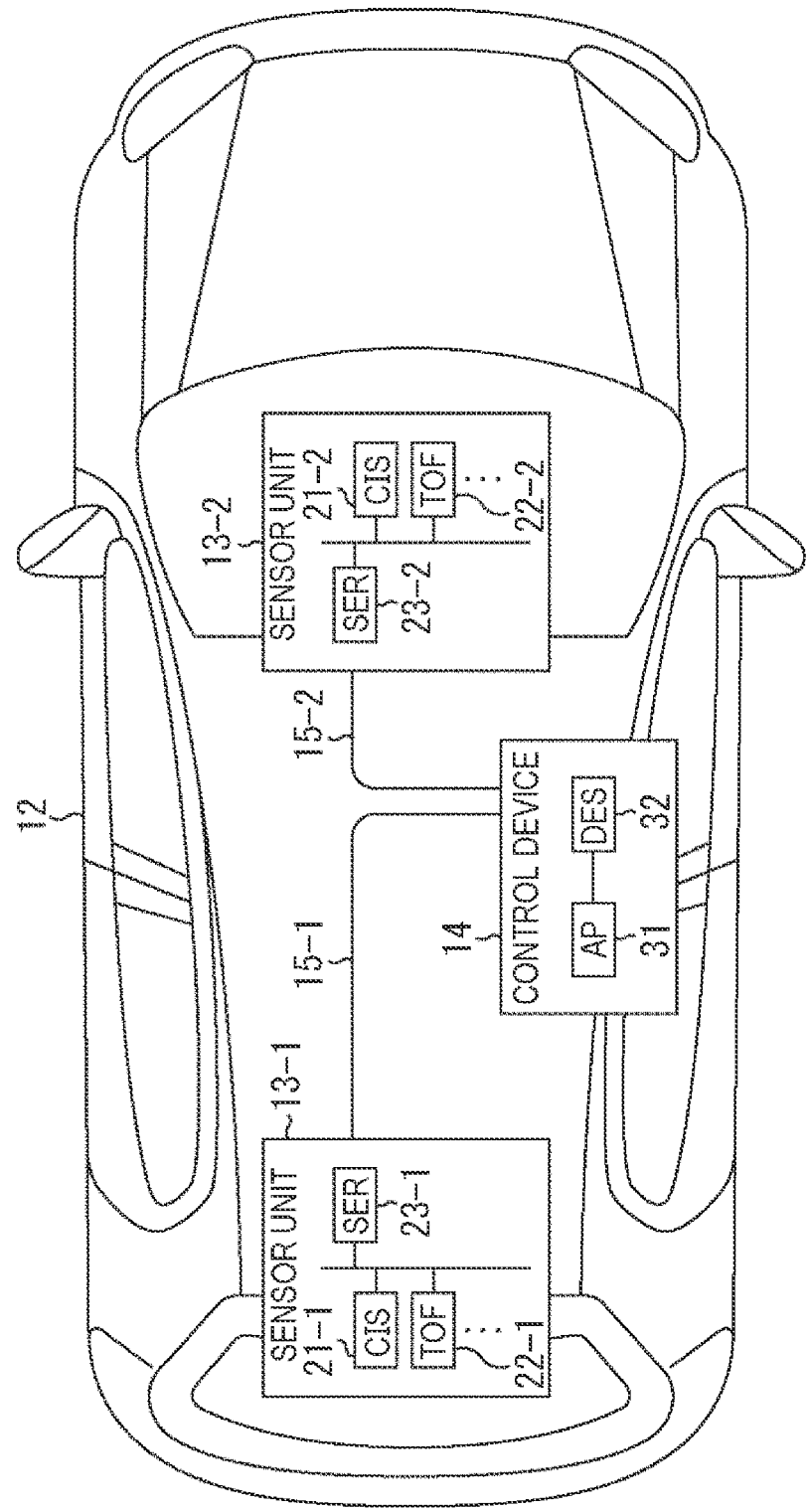
FIG. 1 is a block diagram illustrating a configuration example of an embodiment in which a communication system to which the present technology is applied is mounted on a vehicle.

For example, a communication system 11 illustrated in FIG. 1 is mounted on a vehicle 12, and includes sensor units 13-1 and 13-2, a control device 14, and coaxial cables 15-1 and 15-2.

Furthermore, in the communication system 11 illustrated in FIG. 1, the sensor unit 13-1 arranged toward the front of the vehicle 12 and the sensor unit 13-2 arranged toward the rear of the vehicle 12 are illustrated; however, in addition, a large number of sensor units 13 (not illustrated) are arranged in the vehicle 12 in various directions. Then, those sensor units 13 are connected to the control device 14 via coaxial cables 15, for example, and signals are transmitted between the sensor units 13 and the control device 14. Here, in A-PHY that is a standard of a physical layer developed by Mobile Industry Processor interface (MIPI) Alliance on the assumption of use in communication in such a vehicle 12, it is assumed that the A-PHY is adaptable to a transmission distance of up to 15 m, for example.

The sensor units 13 each include various sensors such as an image sensor 21 (CIS) and a distance sensor 22 (TOF), and those sensors are connected to a serializer 23 (SER) via a bus conforming to the CSI-2 standard. The control device 14 includes an application processor 31 (AP), and the application processor 31 is connected to a deserializer 32 (DES) via the bus conforming to the CSI-2 standard.

Then, communication conforming to the CSI-2 standard is performed between the serializer 23 and sensors such as the image sensor 21 and the distance sensor 22, and between the application processor 31 and the deserializer 32. Furthermore, between the serializer 23 and the deserializer 32, communication via the coaxial cable 15 is performed in accordance with, for example, a standard such as a flat panel display (FPD)-LINK III.

Thus, although the communication system 11 has a configuration in which the serializer 23 and the deserializer 32 are interposed, a plurality of sensors included in each sensor unit 13 and the application processor 31 can mutually transmit and receive signals in accordance with the CSI-2 standard. That is, in the communication system 11, communication is performed such that a plurality of sensors such as the image sensor 21 and the distance sensor 22 is connected to one input port of the application processor 31 via the bus conforming to the CSI-2 standard.

In the following, communication will be described that is performed between a CSI-2 transmission circuit included in the image sensor 21 and a CSI-2 reception circuit included in the application processor 31 in the communication system 11. Furthermore, the communication system 11 is configured to be able to perform communication conforming to the existing CSI-2 standard and to perform communication conforming to the CSI-2 standard extended from the existing CSI-2 (hereinafter, referred to as the extended CSI-2).

Here, with reference to FIG. 2, descriptions will be given of a packet format defined in existing CSI-2 and a packet format defined in extended CSI-2.

For example, in a frame format for transmitting an image for one frame, a packet in which data of a line of an image is stored is generated for each line, between a frame start (FS) indicating the start of the frame and a frame end (FE) indicating the end of the frame.

Figure 2:
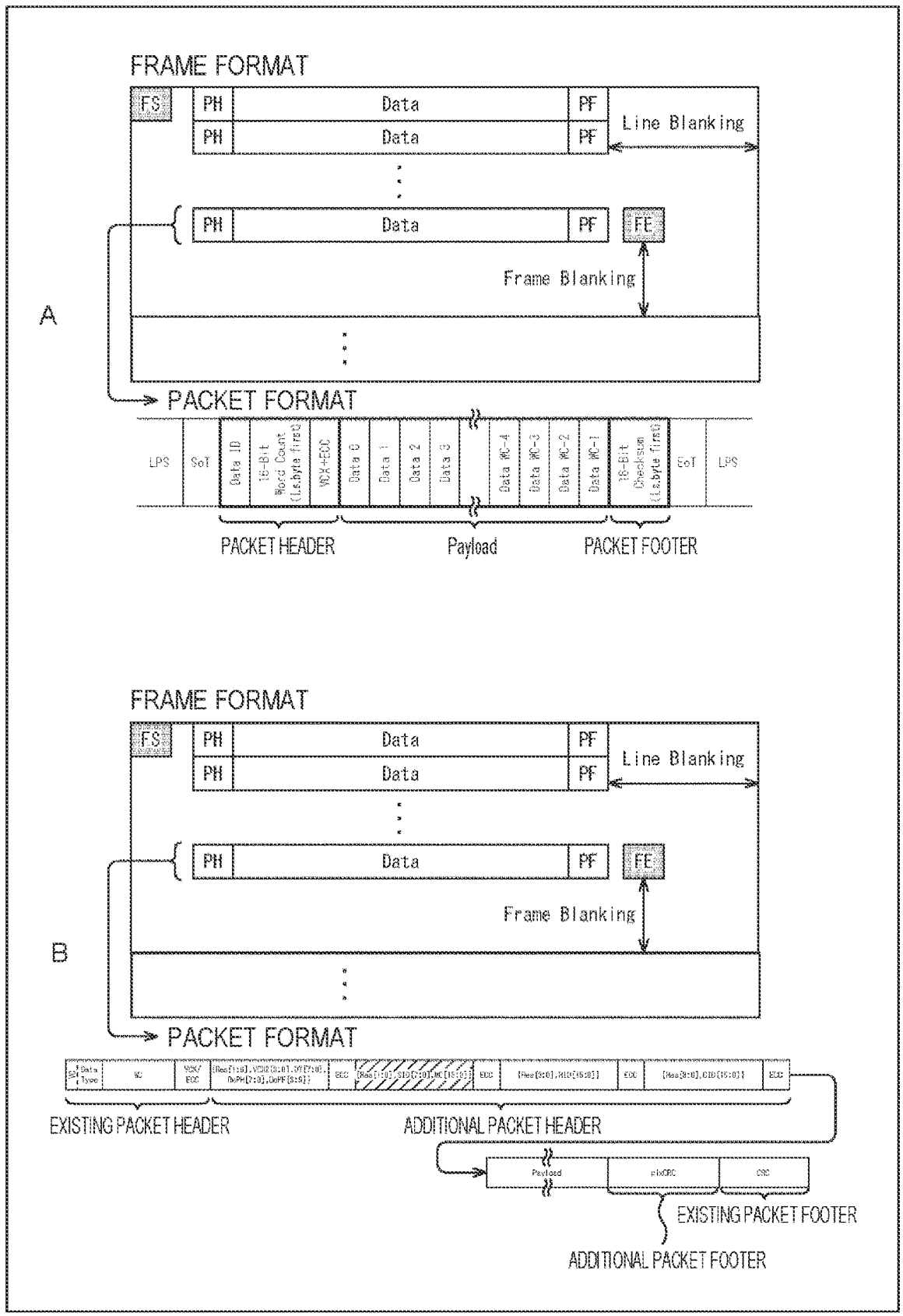
FIG. 2 is a diagram illustrating an example of a packet format.

First, as illustrated in A of FIG. 2, the packet format in the existing CSI-2 is configured such that a packet header is arranged at the head and a packet footer is arranged at the tail. Then, a payload in which data is stored is arranged between the packet header and the packet footer.

On the other hand, as illustrated in B of FIG. 2, in the packet format in the extended CSI-2, the packet header and the packet footer are configured similarly to the existing CSI-2. Then, in the packet format of the extended CSI-2, an additional packet header is arranged after the existing packet header, an additional packet footer is arranged before the existing packet footer, and a payload in which data is stored is arranged between the additional packet header and the additional packet footer. That is, the packet format in the extended CSI-2 is configured such that the additional packet header, the data, and the additional packet footer are stored in the payload of the packet format in the existing CSI-2.

For example, the additional packet header includes a message count (MC) for identifying a packet, and a transmission number incremented each time a packet is transmitted can be used as the message count. Note that, the additional packet header includes, for example, various types of information necessary for applying the communication system 11 to the vehicle 12, in addition to the message count.

Then, in the communication system 11, the packet can be individually identified by using the message count included in the additional packet header, whereby retransmission for each packet can be implemented.

<Configuration Examples of Communication Devices on Transmission Side and Reception Side>

Figure 3:
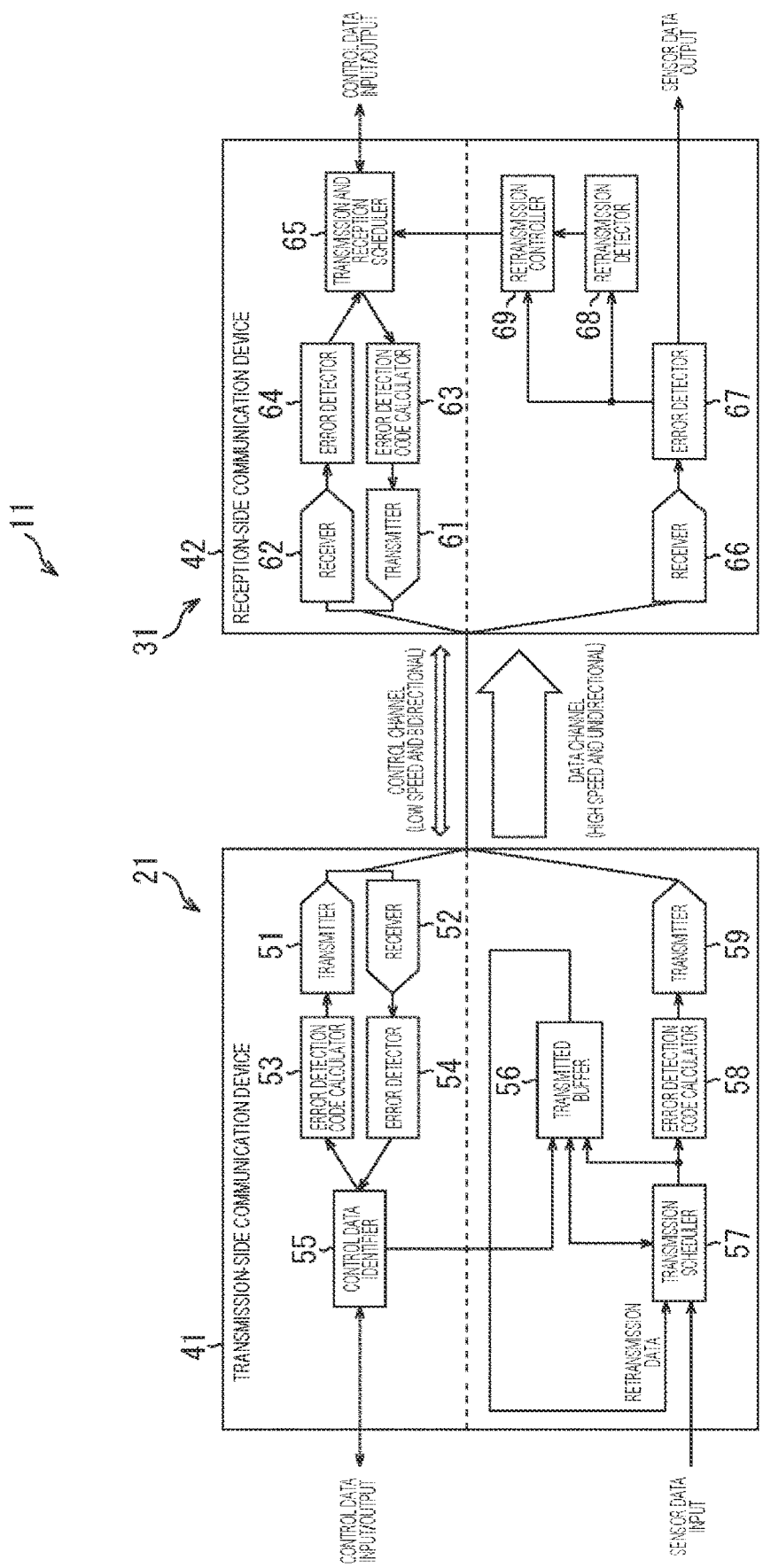
FIG. 3 is a block diagram illustrating configuration examples of a transmission-side communication device and a reception-side communication device.

FIG. 3 is a block diagram illustrating configuration examples of a transmission-side communication device 41 provided in the image sensor 21 and a reception-side communication device 42 provided in the application processor 31.

For example, in the communication system 11, control data is mutually transmitted and received between the transmission-side communication device 41 and the reception-side communication device 42 via a low speed and bidirectional control channel. Furthermore, in the communication system 11, sensor data such as an image is transmitted from the transmission-side communication device 41 to the reception-side communication device 42 via a high speed and unidirectional data channel, for example.

The transmission-side communication device 41 includes a transmitter 51, a receiver 52, an error detection code calculator 53, an error detector 54, a control data identifier 55, a transmitted buffer 56, a transmission scheduler 57, an error detection code calculator 58, and a transmitter 59. For example, each block arranged above a broken line illustrated in the transmission-side communication device 41 is used for a process of transmitting and receiving the control data, and each block arranged below the broken line is used for a process of transmitting the sensor data.

The reception-side communication device 42 includes a transmitter 61, a receiver 62, an error detection code calculator 63, an error detector 64, a transmission and reception scheduler 65, a receiver 66, an error detector 67, a retransmission detector 68, and a retransmission controller 69. For example, each block arranged above a broken line illustrated in the reception-side communication device 42 is used for a process of transmitting and receiving the control data, and each block arranged below the broken line is used for a process of receiving the sensor data.

The transmitter 51 transmits the control data supplied from the error detection code calculator 53 to the reception-side communication device 42 via the control channel.

The receiver 52 receives the control data transmitted from the reception-side communication device 42 via the control channel, and supplies the control data to the error detector 54.

The error detection code calculator 53 calculates, for example, a parity bit or a cyclic redundancy check (CRC) as a code for error detection with respect to the control data supplied via the control data identifier 55. Then, the error detection code calculator 53 adds the code for error detection calculated to the control data and supplies the control data to the transmitter 51.

The error detector 54 detects whether or not an error has occurred in the control data by using the code for error detection added to the control data supplied from the receiver 52. Then, in accordance with a result of performing the error detection on the control data, in a case where no error has occurred in the control data, the error detector 54 supplies the control data as it is to the control data identifier 55. On the other hand, in accordance with the result of performing the error detection on the control data, in a case where an error has occurred in the control data, the error detector 54 notifies that the error has occurred in the control data and supplies the control data to the control data identifier 55.

The control data identifier 55, for example, inputs and outputs control data to and from a control circuit (not illustrated) that controls the image sensor 21, and identifies control data transmitted from the reception-side communication device 42. That is, when supplying the control data input from the control circuit to the error detection code calculator 53 and outputting the control data supplied from the error detector 54 to the control circuit, the control data identifier 55 identifies the control data. For example, in a case where retransmission request data as described later is transmitted from the reception-side communication device 42 as the control data supplied from the error detector 54, the control data identifier 55 detects and supplies the retransmission request data to the transmitted buffer 56.

A transmission packet transmitted from the transmission-side communication device 41 to the reception-side communication device 42 is supplied from the transmission scheduler 57 to the transmitted buffer 56. Then, the transmitted buffer 56 temporarily holds the transmission packet supplied from the transmission scheduler 57 as a transmitted packet. Furthermore, when the retransmission request data is supplied from the control data identifier 55, the transmitted buffer 56 supplies as appropriate a transmitted packet for which retransmission is requested by the retransmission request data, from among transmitted packets held, to the transmission scheduler 57 as a retransmission packet. Note that, the sensor data stored in the payload of the retransmission packet is hereinafter also referred to as retransmission data as appropriate.

The sensor data is input to the transmission scheduler 57 from an imaging element (not illustrated) included in the image sensor 21. Here, a packet in which sensor data newly input from the image sensor 21 to the transmission scheduler 57, that is, sensor data that is not retransmission data is stored in the payload is hereinafter referred to as a new packet as appropriate. Furthermore, the transmission scheduler 57 exchanges a retransmission data transmission request and retransmission data transmission permission with the transmitted buffer 56 as described later, and the retransmission packet is supplied from the transmitted buffer 56. Then, the transmission scheduler 57 adjusts a timing of transmitting each of the new packet or the retransmission packet, and sequentially supplies the new packet or the retransmission packet to the transmitted buffer 56 and the error detection code calculator 58 as the transmission packet to be transmitted from the transmission-side communication device 41 to the reception-side communication device 42.

The error detection code calculator 58 calculates, for example, a parity bit or a CRC as a code for error detection of the transmission packet supplied from the transmission scheduler 57, adds the code for error detection to the transmission packet, and supplies the transmission packet to the transmitter 59.

The transmitter 59 transmits the transmission packet supplied from the error detection code calculator 58 to the reception-side communication device 42 via the data channel.

The transmitter 61, the receiver 62, the error detection code calculator 63, and the error detector 64 are configured similarly to the transmitter 51, the receiver 52, the error detection code calculator 53, and the error detector 54, respectively.

The transmission and reception scheduler 65 inputs and outputs control data to and from a control circuit (not illustrated) that controls the application processor 31, and manages a schedule of control data to be transmitted and received to and from the transmission-side communication device 41, for example. That is, the transmission and reception scheduler 65 outputs the control data supplied from the error detector 64 to the control circuit, supplies the control data input from the control circuit to the error detection code calculator 63 at a predetermined timing, and transmits the control data to the transmission-side communication device 41. Moreover, when the retransmission request data is supplied from the retransmission controller 69, the transmission and reception scheduler 65 supplies the retransmission request data to the error detection code calculator 63 as control data, and causes the control data to be transmitted to the transmission-side communication device 41.

The receiver 66 receives the transmission packet transmitted from the transmission-side communication device 41 via the data channel and supplies the transmission packet to the error detector 67.

The error detector 67 detects whether or not an error has occurred in the transmission packet by using a code for error detection added to the transmission packet supplied from the receiver 66. Then, the error detector 67 outputs, to a processing circuit at a subsequent stage, the sensor data stored in the payload of the transmission packet together with an error detection result indicating a result of detecting whether or not the error has occurred in the transmission packet by using the code for error detection added to the transmission packet.

Moreover, the error detector 67 supplies an error detection result indicating a result of detecting an error having occurred in the transmission packet to the retransmission detector 68. For example, in a case where it is detected that a header error or a payload error has occurred in the transmission packet received by the reception-side communication device 42, the error detector 67 supplies an error detection result indicating that the header error or the payload error is detected to the retransmission detector 68. Furthermore, the error detector 67 supplies the message count included in the additional packet header of the transmission packet received by the reception-side communication device 42 to the retransmission detector 68.

On the basis of the error detection result and the message count supplied from the error detector 67, the retransmission detector 68 performs a retransmission detection process of detecting the message count of a transmission packet that cannot be received by the reception-side communication device 42 and needs to be retransmitted. Then, the retransmission detector 68 detects the message count detected in the retransmission detection process as a retransmission candidate message count that is a candidate for which retransmission is requested, and supplies the message count to the retransmission controller 69. Note that, the retransmission detection process performed by the retransmission detector 68 will be described later with reference to FIGS. 5 to 12.

The retransmission controller 69 performs a retransmission request process of generating retransmission request data for requesting transmission of a retransmission packet on the basis of the retransmission candidate message count supplied from the retransmission detector 68 and various types of information transmitted from the transmission-side communication device 41 and supplying the retransmission request data to the transmission and reception scheduler 65. Note that, the retransmission request process performed by the retransmission detector 68 will be described later with reference to FIGS. 13 to 15.

Here, in the communication system 11, various types of information necessary for performing the retransmission request process in the retransmission controller 69 are embedded in the header of the transmission packet in which the sensor data is stored in the payload, and transmitted from the transmission-side communication device 41 to the reception-side communication device 42. For example, the transmission-side communication device 41 can transmit the various types of information necessary for performing the retransmission request process in the retransmission controller 69 by using the user defined area of the additional packet header defined in the extended CSI-2, and the information is supplied to the retransmission controller 69 via the error detector 67.

The transmission-side communication device 41 and the reception-side communication device 42 are configured as described above, and retransmission for each packet can be implemented by using the message count included in the additional packet header defined in the extended CSI-2.

Figure 4:
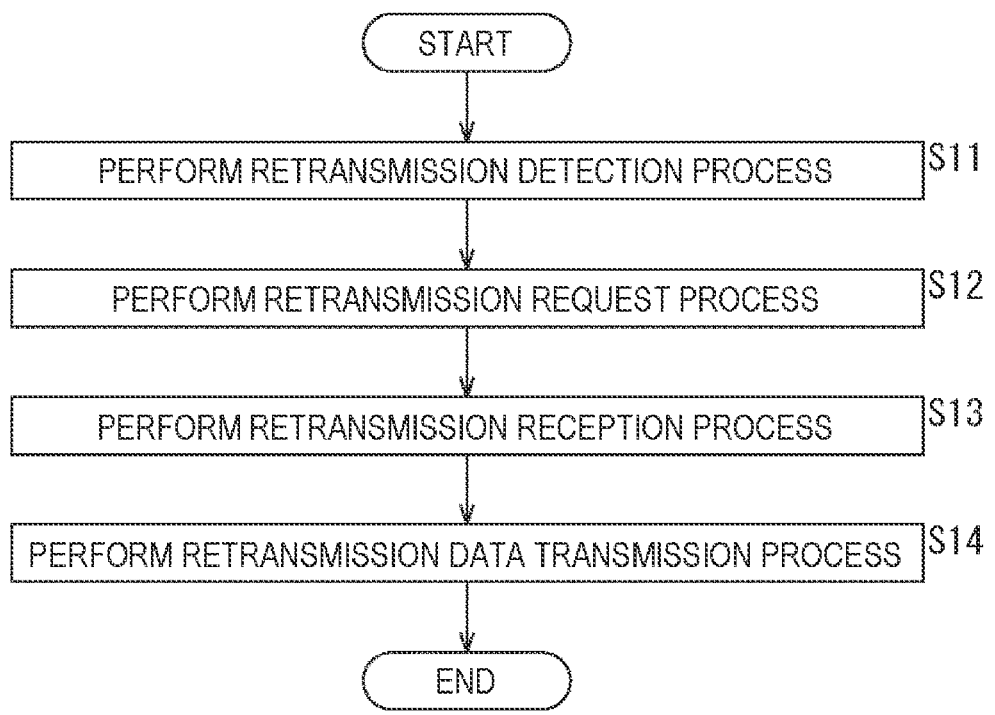
FIG. 4 is a flowchart for explaining a packet retransmission process.

With reference to a flowchart illustrated in FIG. 4, a schematic description will be given of a packet retransmission process executed in the communication system 11.

In step S11, the retransmission detector 68 of the reception-side communication device 42 performs the retransmission detection process. For example, the retransmission detector 68 detects the message count of the transmission packet that cannot be received by the reception-side communication device 42 and needs to be retransmitted on the basis of the error detection result and the message count supplied from the error detector 67.

In step S12, the retransmission controller 69 of the reception-side communication device 42 performs the retransmission request process. For example, the retransmission controller 69 creates a retransmission list in which the message count of the packet requesting retransmission is registered while performing filtering with the oldest message count held in the transmitted buffer 56 from among retransmission candidate message counts supplied from the retransmission detector 68. As a result, a message count newer than the oldest message count held in the transmitted buffer 56 among the retransmission candidate message counts is registered in the retransmission list. Then, the retransmission controller 69 adjusts a transmission timing of a retransmission request in consideration of the number of queues of the transmitted buffer 56, and generates retransmission request data specifying a message count to which a retransmission frequency is given in consideration of the number of queues of the transmitted buffer 56 at the time of the retransmission request.

In step S13, the control data identifier 55 and the transmitted buffer 56 of the transmission-side communication device 41 perform a retransmission reception process. For example, the control data identifier 55 identifies the retransmission request data generated by the retransmission controller 69 from among the control data supplied from the error detector 54, and supplies a retransmission request packet to the transmitted buffer 56. Then, the transmitted buffer 56 searches for a transmitted packet held, by using the message count specified by the retransmission request data, and when acquiring the transmitted packet for which retransmission is requested as a search result, secures the transmitted packet as a retransmission packet. On the other hand, in a case where the transmitted packet for which retransmission is requested cannot be acquired as a search result, the transmitted buffer 56 discards the retransmission request data used for the search.

In step S14, the transmission scheduler 57 of the transmission-side communication device 41 performs a retransmission data transmission process. For example, the transmission scheduler 57 adjusts a timing of transmitting the retransmission packet secured in the transmitted buffer 56 and a new packet in which newly input sensor data is stored in the payload, and transmits as appropriate the new packet or the retransmission packet as a transmission packet.

As described above, in the communication system 11, retransmission can be requested for each transmission packet transmitted from the transmission-side communication device 41 to the reception-side communication device 42, and transmission can be executed of the retransmission packet for which retransmission is requested.

<Processing Example of Retransmission Detection Process>

With reference to FIGS. 5 to 12, a description will be given of the retransmission detection process performed by the retransmission detector 60. Note that, hereinafter, the existing packet header and the additional packet header illustrated in FIG. 2 are referred to as headers, and all data arranged behind the headers are referred to as payloads.

Figure 5:
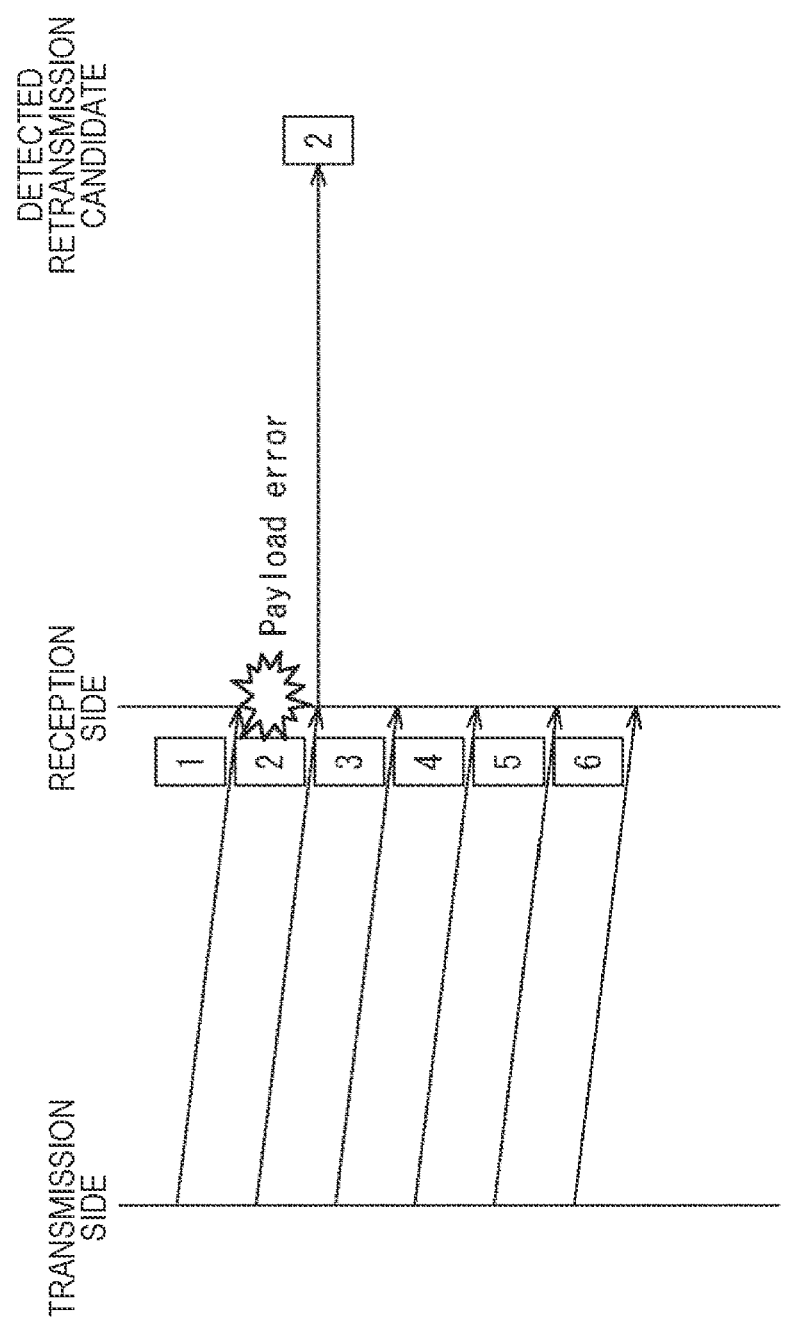
FIG. 5 is a diagram for explaining a retransmission detection process in a case where a payload error occurs.
Figure 6:
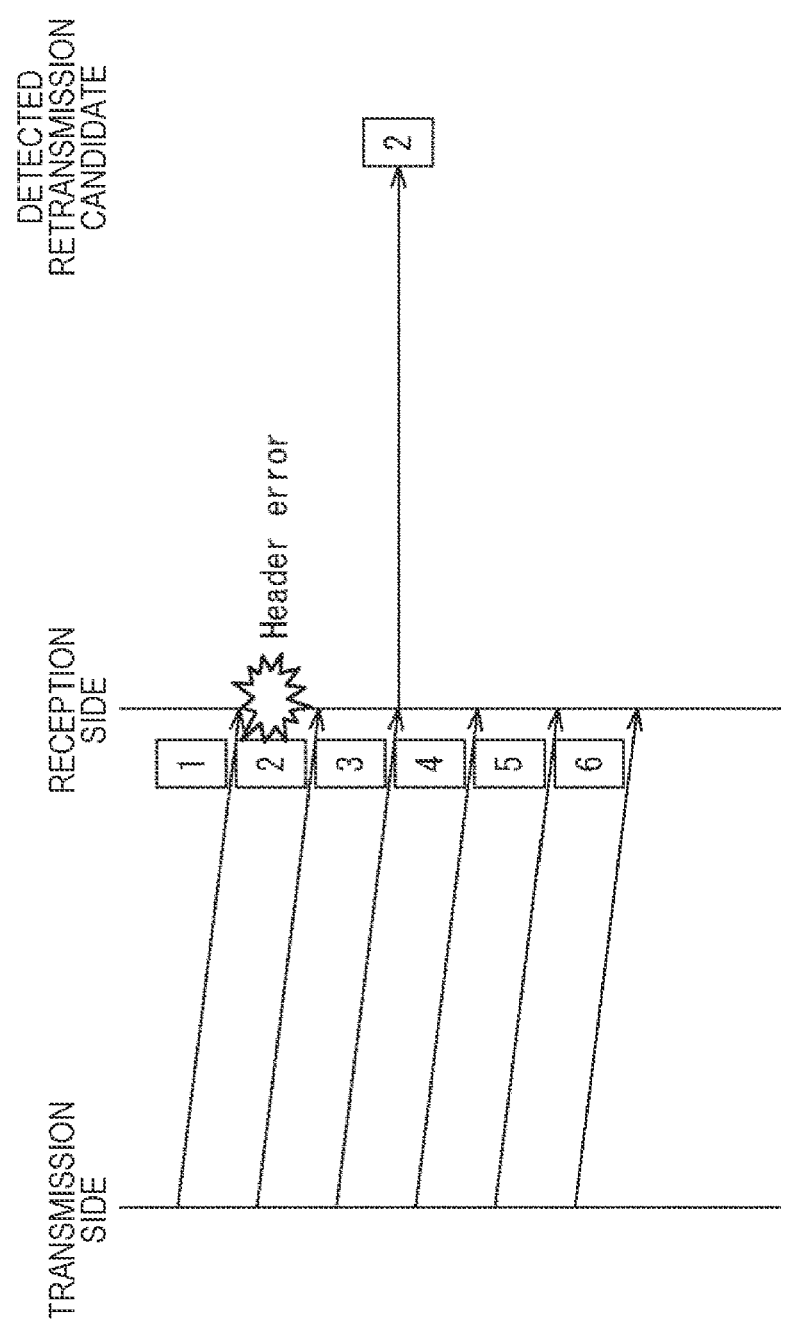
FIG. 6 is a diagram for explaining a retransmission detection process in a case where a header error occurs.
Figure 7:
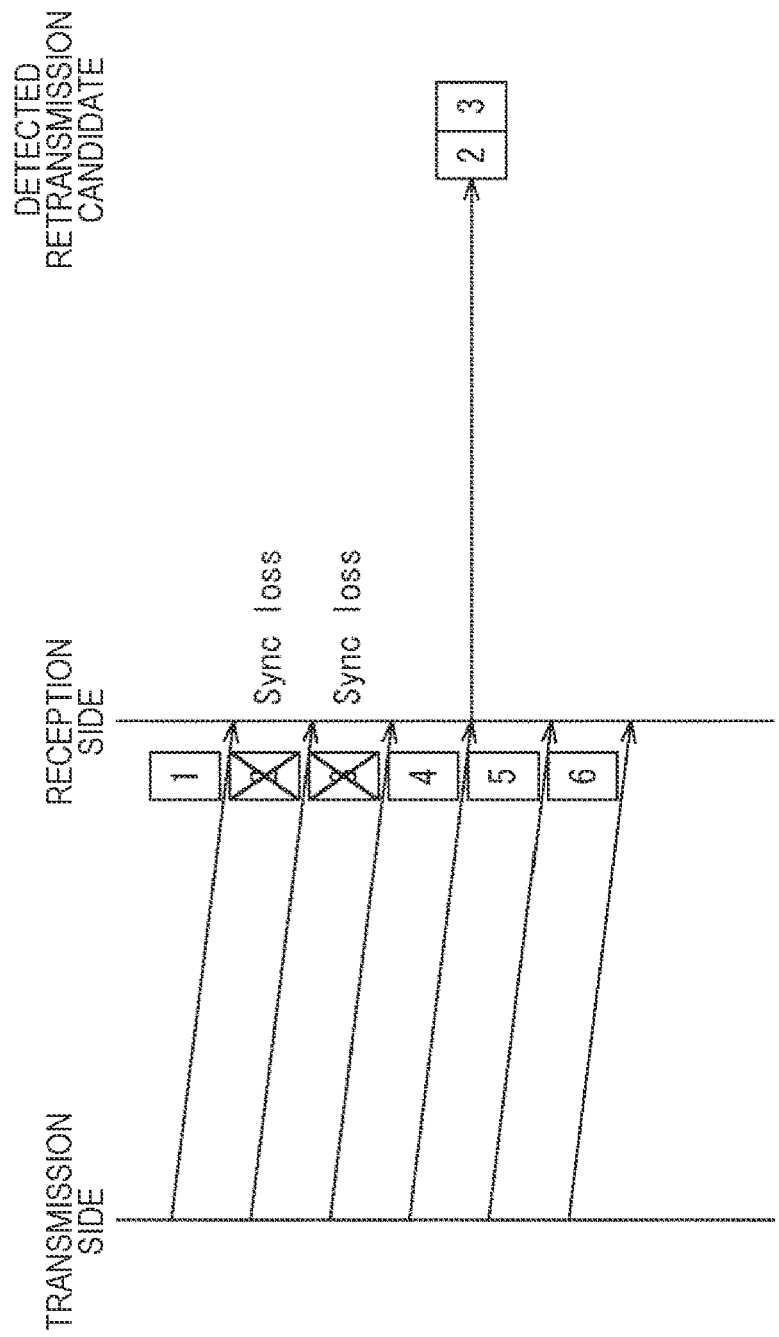
FIG. 7 is a diagram for explaining a retransmission detection process in a case where a sync loss occurs.

FIGS. 5 to 7 are diagrams for explaining retransmission detection processes triggered by reception of the message count included in the header, and numbers (1 to 6) surrounded by rectangular frames illustrated in each of FIGS. 5 to 7 represent message counts.

FIG. 5 illustrates an example of the retransmission detection process of detecting the retransmission candidate message count in a case of a payload error in which the header can be normally received and an error occurs only in the payload. Furthermore, FIG. 5 illustrates a state in which a payload error has occurred in the transmission packet with a message count 2.

First, when the reception-side communication device 42 normally receives the transmission packet with a message count 1, the retransmission detector 68 checks the header of the transmission packet to acquire the message count 1, included in the header, and updates the message count 1 as a retransmission detected message count for which detection of whether or not to retransmit has already been performed. Thereafter, the reception-side communication device 42 receives the transmission packet with the message count 2, and a payload error has occurred in the transmission packet. Thus, the retransmission detector 68 checks the header of the transmission packet to acquire the message count 2 included in the header, and recognizes that the payload error has occurred in the transmission packet with the message count 2.

At this time, the retransmission detector 68 can detect the message count 2 as the retransmission candidate message count since the message count 1 that is a retransmission detected message count and the message count 2 of the transmission packet in which the payload error has occurred are consecutive.

FIG. 6 illustrates an example of the retransmission detection process of detecting the retransmission candidate message count in a case where a header error has occurred and the payload is normal or has an error. Furthermore, FIG. 6 illustrates a state in which the header error has occurred in the transmission packet with the message count 2.

First, when the reception-side communication device 42 receives the transmission packet with the message count 1 normally, the retransmission detector 68 checks the header of the transmission packet to acquire the message count 1 included in the header, and updates the message count 1 as a retransmission detected message count. Thereafter, the reception-side communication device 42 receives the transmission packet with the message count 2, and the header error has occurred in the transmission packet. Thus, the retransmission detector 68 cannot check the header of the transmission packet, and the retransmission detected message count is not updated.

Then, in a case where the reception-side communication device 42 receives the transmission packet with a message count 3 normally, the retransmission detector 68 checks the header of the transmission packet to acquire the message count 3 included in the header. At this time, since the message count 1 that is a retransmission detected message count and the message count 3 of the transmission packet that can be normally received are non-consecutive, the retransmission detector 68 can detect the message count 2 to be present between the message count 1 and the message count 3 as the retransmission candidate message count.

FIG. 7 illustrates an example of the retransmission detection process of detecting the retransmission candidate message count in a case where head detection of the transmission packet has failed and a sync loss has occurred in which presence of the transmission packet cannot be recognized in the reception-side communication device 42. Furthermore, FIG. 7 illustrates a state in which the sync loss has occurred in the message count 2 and the message count 3.

First, when the reception-side communication device 42 receives the transmission packet with the message count 1 normally, the retransmission detector 68 checks the header of the transmission packet to acquire the message count 1 included in the header, and updates the message count 1 as a retransmission detected message count. Thereafter, since the sync loss has occurred, the reception-side communication device 42 cannot recognize presence of the transmission packets with the message count 2 and the message count 3, and the retransmission detected message count is not updated.

Then, in a case where the reception-side communication device 42 receives the transmission packet with a message count 4 normally, the retransmission detector 68 checks the header of the transmission packet to acquire the message count 4 included in the header. At this time, since the message count 1 that is the retransmission detected message count and the message count 4 of the transmission packet that can be normally received are non-consecutive, the retransmission detector 68 can detect the message count 2 and the message count 3 that should be present between the message count 1 and the message count 4 as retransmission candidate message counts.

As described above, in the reception-side communication device 42, the retransmission detector 68 can detect the retransmission candidate message count with reception of the message count included in the header as a trigger.

Figure 8:
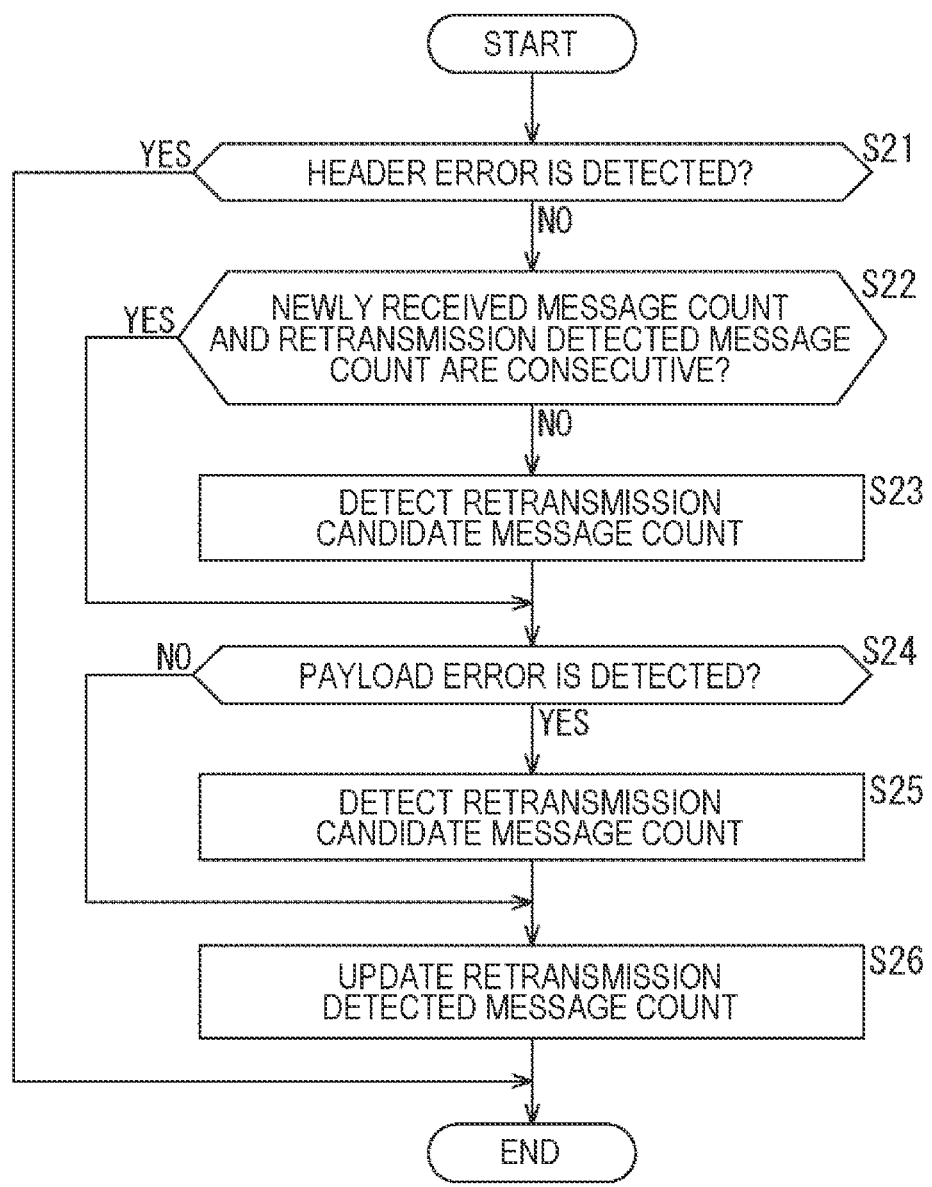
FIG. 8 is a flowchart for explaining a retransmission detection process triggered by reception of a message count included in a header.

With reference to a flowchart illustrated in FIG. 8, a description be given of the retransmission detection process triggered by reception of the message count included in the header.

For example, when a transmission packet is newly received in the reception-side communication device 42, the process is started, and in step S21, the retransmission detector 68 determines whether or not a header error is detected for the newly received transmission packet in accordance with the error detection result supplied from the error detector 67.

In step S21, in a case where the retransmission detector 68 determines that no header error is detected for the newly received transmission packet, the process proceeds to step S22.

In step S22, the retransmission detector 68 determines whether or not the message count checked from the header of the newly received transmission packet and the retransmission detected message count are consecutive. For example, in a case where a difference between the message count checked from the header of the newly received transmission packet and the retransmission detected message count is 1, the retransmission detector 68 determines that the message counts are consecutive, and in a case where the difference is greater than 1, the retransmission detector determines that the message counts are not consecutive.

In step S22, in a case where the retransmission detector 68 determines that the message count checked from the header of the newly received transmission packet and the retransmission detected message count are not consecutive, the process proceeds to step S23.

In step S23, the retransmission detector 68 detects a message count of a portion non-consecutive between the message count included in the header of the newly received transmission packet and the retransmission detected message count as the retransmission candidate message count. For example, the retransmission detector 68 detects, as the retransmission candidate message count, message counts from a message count obtained by adding 1 to the retransmission detected message count to a message count obtained by subtracting 1 from the message count included in the header of the newly received packet.

After the process of step S23 or in a case where it is determined in step S22 that the message count included in the header of the transmission packet and the retransmission detected message count are consecutive, the process proceeds to step S24.

In step S24, the retransmission detector 68 determines whether or not a payload error is detected for the newly received transmission packet in accordance with the error detection result supplied from the error detector 67.

In step S24, in a case where the retransmission detector 68 determines that the payload error is detected for the newly received transmission packet, the process proceeds to step S25.

In step S25, the retransmission detector 68 detects a message count included in the header of the transmission packet in which the payload error is detected as the retransmission candidate message count. For example, the retransmission detector 68 detects, as the retransmission candidate message count, message counts from a message count obtained by adding 1 to the retransmission detected message count to a message count included in the header of the newly received transmission packet.

After the process of step S25 or in a case where it is determined in step S24 that no payload error is detected for the transmission packet, the process proceeds to step S26.

In step S26, the retransmission detected message count is updated by the message count checked from the header of the newly received transmission packet.

After the process of step S26 or in a case where it is determined in step S21 that the header error is detected for the transmission packet, the process is ended.

As described above, the retransmission detector 68 can detect the retransmission candidate message count that is a candidate for which retransmission is requested with reception of the message count included in the header as a trigger.

Figure 9:
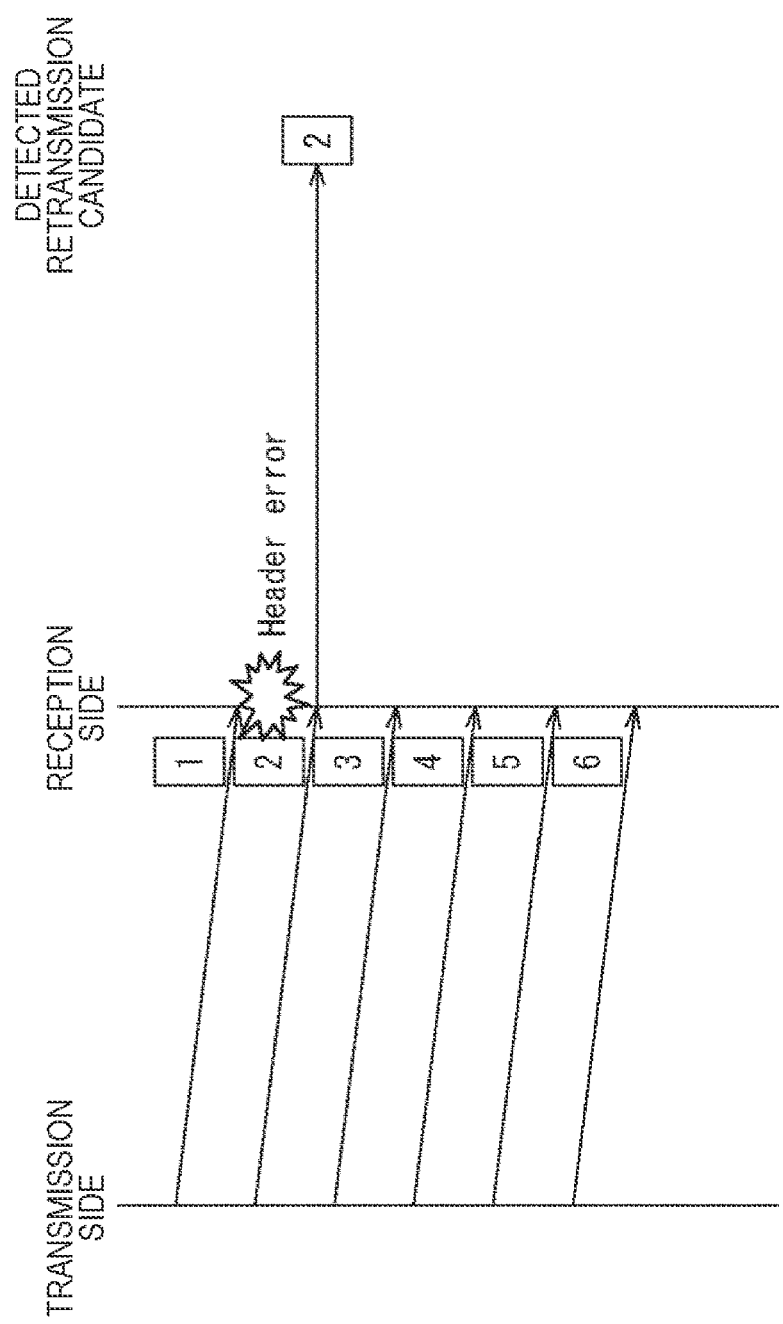
FIG. 9 is a diagram for explaining a retransmission detection process in a case where a header error occurs.
Figure 10:
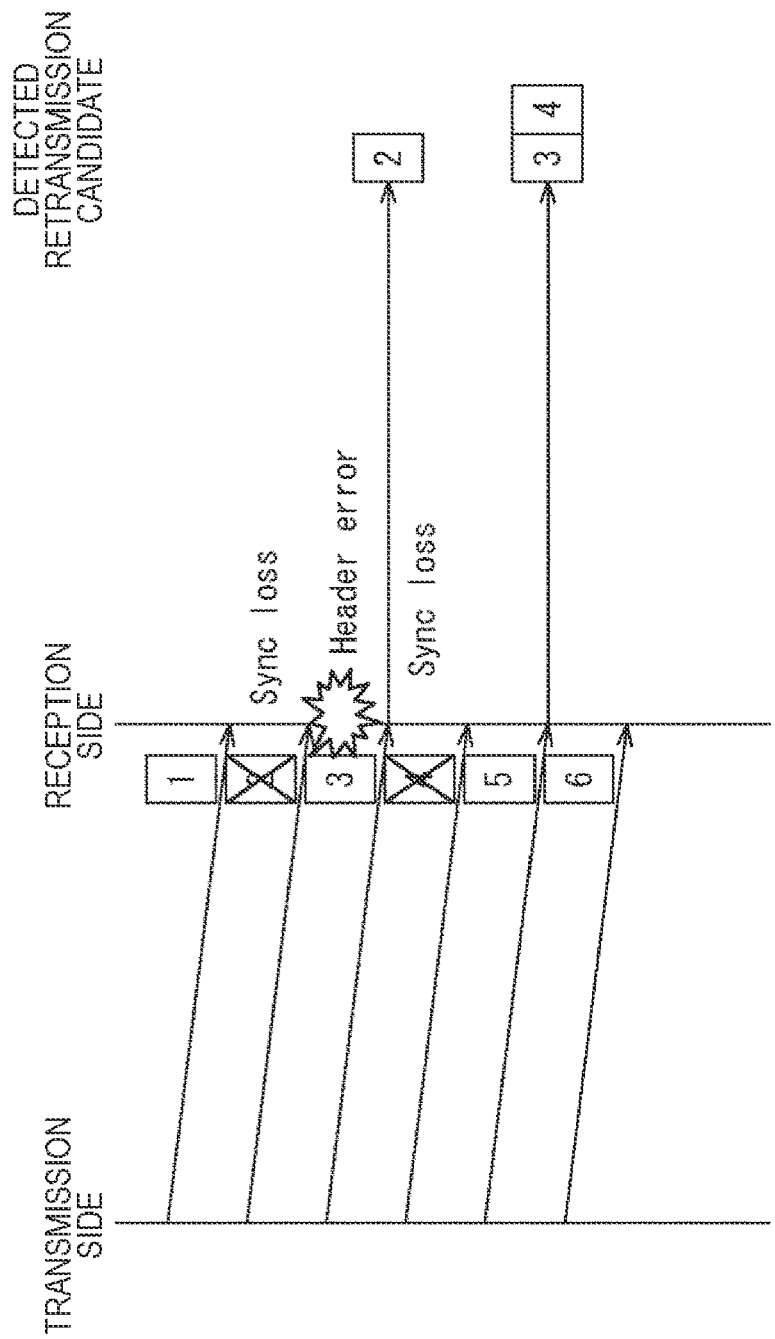
FIG. 10 is a diagram for explaining a retransmission detection process in a case where a sync loss and a header error occur.
Figure 11:
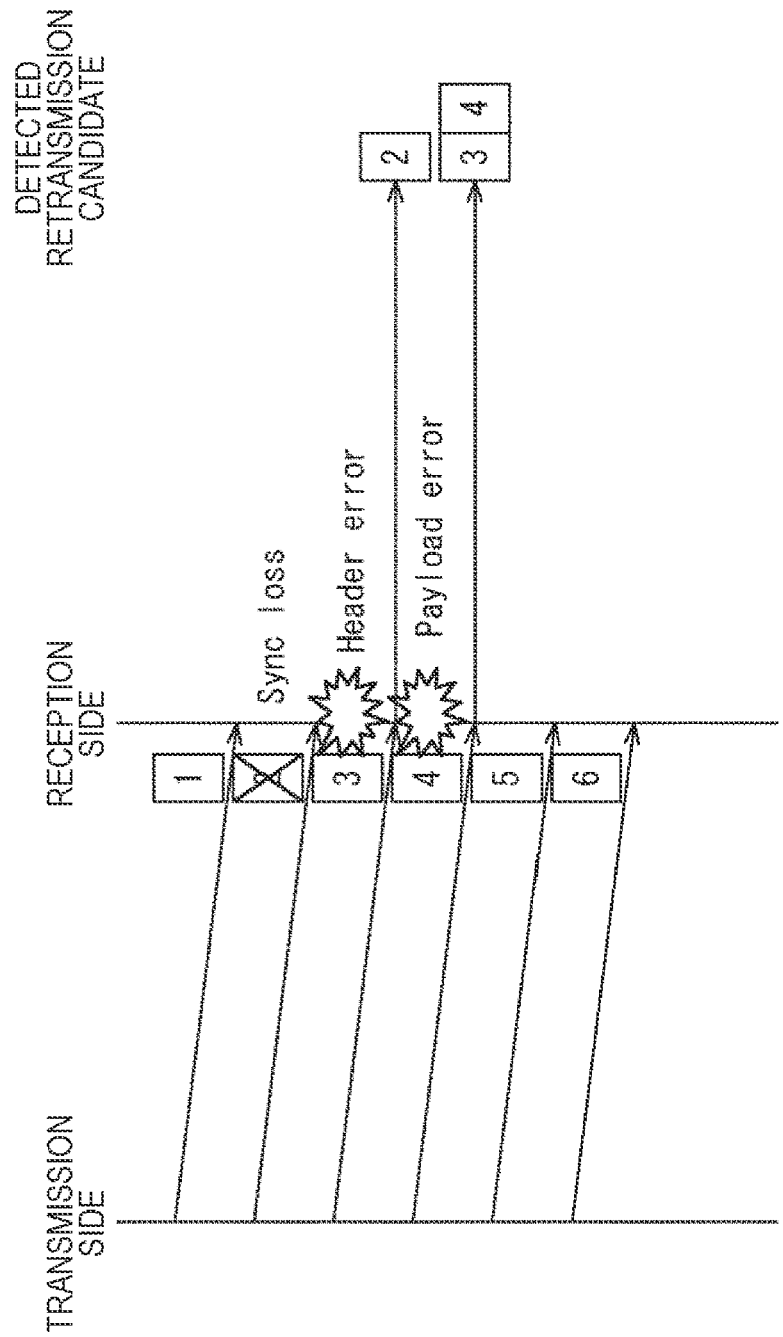
FIG. 11 is a diagram for explaining a retransmission detection process in a case where a sync loss, a header error, and a payload error occur.

FIGS. 9 to 11 are diagrams for explaining retransmission detection processes triggered by detection of the transmission packet, and numbers (1 to 6) surrounded by rectangular frames illustrated in each of FIGS. 9 to 11 represent message counts. Note that, the retransmission detection process in a case where a payload error (FIG. 5) and a sync loss (FIG. 7) occur is performed similarly as described above, and a case where a pattern other than those occurs will be described.

FIG. 9 illustrates an example of the retransmission detection process of detecting the retransmission candidate message count in a case where a header error has occurred and the payload is normal or has an error. Furthermore, FIG. 9 illustrates a state in which the header error has occurred in the transmission packet with the message count 2.

First, when the reception-side communication device 42 receives the transmission packet with the message count 1 normally, the retransmission detector 68 checks the header of the transmission packet to acquire the message count 1 included in the header, and updates the message count 1 as a retransmission detected message count. Thereafter, the reception-side communication device 42 receives the transmission packet with the message count 2, and the header error has occurred in the transmission packet. Thus, the retransmission detector 68 cannot check the header of the transmission packet, and the retransmission detected message count is not updated. At this time, the retransmission detector 68 estimates that the message count 2 that is consecutive to the message count 1 that is the retransmission detected message count is at least a retransmission candidate.

Then, in a case where the reception-side communication device 42 receives the transmission packet with a message count 3 normally, the retransmission detector 68 checks the header of the transmission packet to acquire the message count 3 included in the header. At this time, since the message count 2 estimated as the retransmission candidate and the message count 3 of the transmission packet that can be normally received are consecutive, the retransmission detector 68 can detect, as the retransmission candidate message count, only the message count 2 estimated as the retransmission candidate message count.

FIG. 10 illustrates an example of the retransmission detection process of detecting the retransmission candidate message count in a case where a sync loss and a header error occur. Furthermore, FIG. 10 illustrates a state in which the sync loss occurs in the transmission packets with the message count 2 and the message count 4 and the header error occurs in the transmission packet with the message count 3.

First, when the reception-side communication device 42 receives the transmission packet with the message count 1 normally, the retransmission detector 68 checks the header of the transmission packet to acquire the message count 1 included in the header, and updates the message count 1 as a retransmission detected message count. Thereafter, since the sync loss has occurred, the reception-side communication device 42 cannot recognize presence of the transmission packet with the message count 2, and the retransmission detected message count is not updated.

Moreover, the reception-side communication device 42 receives the transmission packet with the message count 3, and the header error has occurred in the transmission packet. Thus, the retransmission detector 68 cannot check the header of the transmission packet, and the retransmission detected message count is not updated. At this time, the retransmission detector 68 estimates that the message count 2 that is consecutive to the message count 1 that is the retransmission detected message count is at least a retransmission candidate.

Thereafter, since the sync loss occurs, the reception-side communication device 42 cannot recognize presence of the transmission packet with the message count 4, and the retransmission detected message count is not updated.

Then, in a case where the reception-side communication device 42 receives the transmission packet with a message count 5 normally, the retransmission detector 68 checks the header of the transmission packet to acquire the message count 5 included in the header. At this time, the message count 2 estimated as the retransmission candidate and the message count 5 of the transmission packet that can be normally received are non-consecutive. Thus, in addition to the message count 2 estimated as the retransmission candidate, the retransmission detector 68 can detect the message count 3 and the message count 4 that should be between the non-consecutive message counts as retransmission candidate message counts.

FIG. 11 illustrates an example of the retransmission detection process of detecting the retransmission candidate message count in a case where a sync loss, a header error, and a payload error occur. Furthermore, FIG. 11 illustrates a state in which the synch loss occurs in the transmission packet with the message count 2, the header error occurs in the transmission packet with the message count 3, and the payload error occurs in the transmission packet with the message count 4.

First, when the reception-side communication device 42 receives the transmission packet with the message count 1 normally, the retransmission detector 68 checks the header of the transmission packet to acquire the message count 1 included in the header, and updates the message count 1 as a retransmission detected message count. Thereafter, since the sync loss has occurred, the reception-side communication device 42 cannot recognize presence of the transmission packet with the message count 2, and the retransmission detected message count is not updated.

Moreover, the reception-side communication device 42 receives the transmission packet with the message count 3, and the header error has occurred in the transmission packet. Thus, the retransmission detector 68 cannot check the header of the transmission packet, and the retransmission detected message count is not updated. At this time, the retransmission detector 68 estimates that the message count 2 that is consecutive to the message count 1 that is the retransmission detected message count is at least a retransmission candidate.

Thereafter, the reception-side communication device 42 receives the transmission packet with the message count 4, and the payload error has occurred in the packet. Thus, the retransmission detector 68 checks the header of the transmission packet to acquire the message count 4 included in the header. At this time, the message count 2 estimated as the retransmission candidate and the message count 4 of the transmission packet in which the payload error has occurred are non-consecutive. Thus, in addition to the message count 2 estimated as the retransmission candidate, the retransmission detector 68 can detect, as retransmission candidate message counts, the message count 3 that should be between the non-consecutive message counts, and the message count 4 in which the payload error has occurred.

Figure 12:
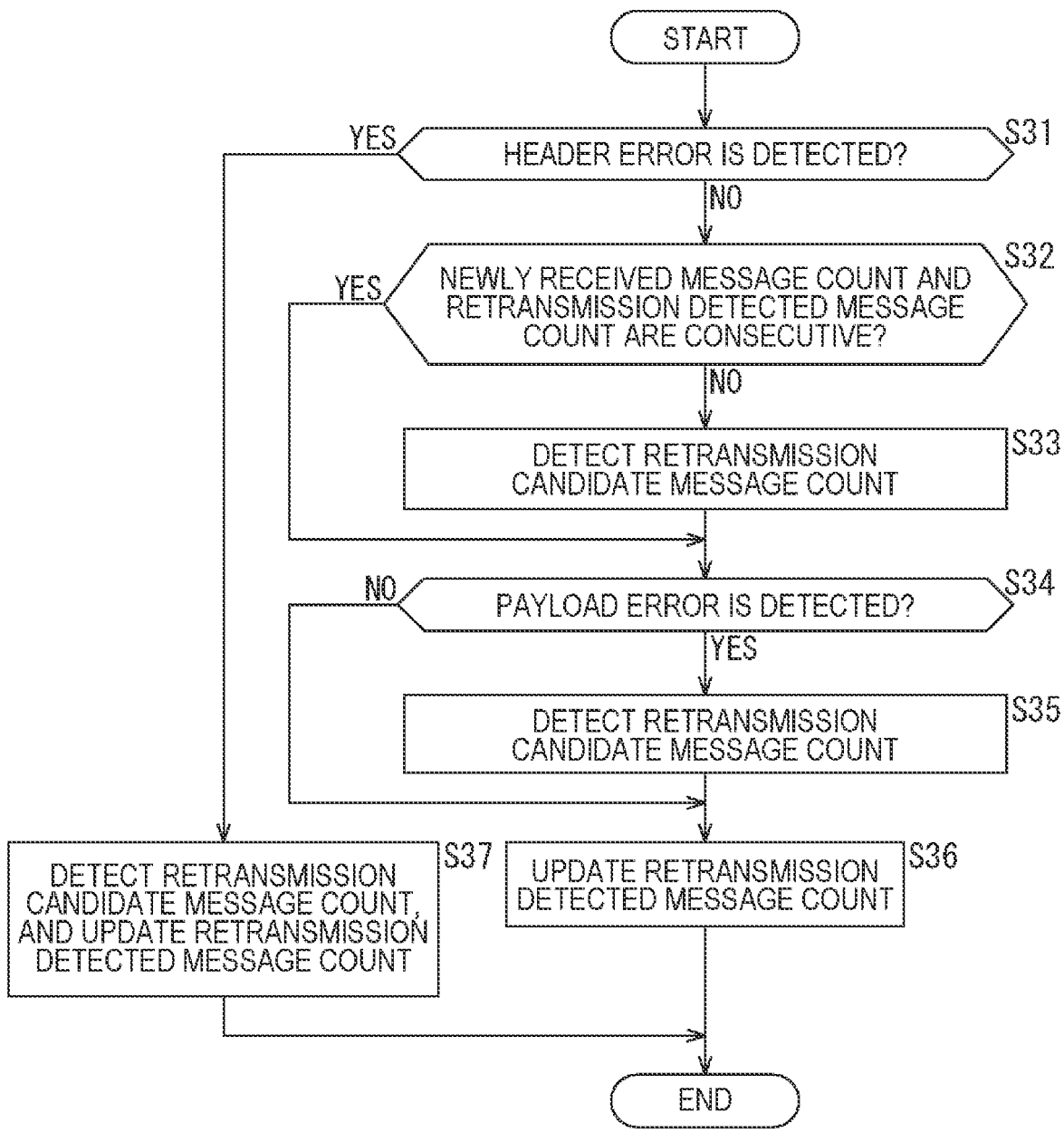
FIG. 12 is a flowchart for explaining a retransmission detection process triggered by detection of a packet.

With reference to a flowchart illustrated in FIG. 12, a description will be given of the retransmission detection process triggered by detection of the transmission packet.

In steps S31 to S36, processes similar to those in steps S21 to S26 in FIG. 8 are performed, and a detailed description thereof will be omitted.

Then, in step S31, in a case where the retransmission detector 68 determines that the header-error is detected for the newly received transmission packet, the process proceeds to step S37.

In step S37, the retransmission detector 68 detects a message count obtained by adding 1 to the retransmission detected message count as the retransmission candidate message count. Moreover, the retransmission detector 68 increments (+1) the current retransmission detected message count to update the retransmission detected message count. After the process of step S37, the process is ended.

That is, in the retransmission detection process triggered by detection of the transmission packet, in a case where the header error is detected, a process is performed different from the retransmission detection process triggered by reception of the message count included in the header of FIG. 8 described above. That is, in the retransmission detection process triggered by detection of the transmission packet, in a case where the header error is detected, at least a message count obtained by adding 1 to the retransmission detected message count is estimated as the retransmission candidate, and is detected as the retransmission candidate message count in step S37.

As described above, the retransmission detector 68 can detect the retransmission candidate message count that is a candidate for which retransmission is requested with detection of the transmission packet as a trigger.

<Configuration Example of Retransmission Controller and Processing Example of Retransmission Request Process>

Figure 13:
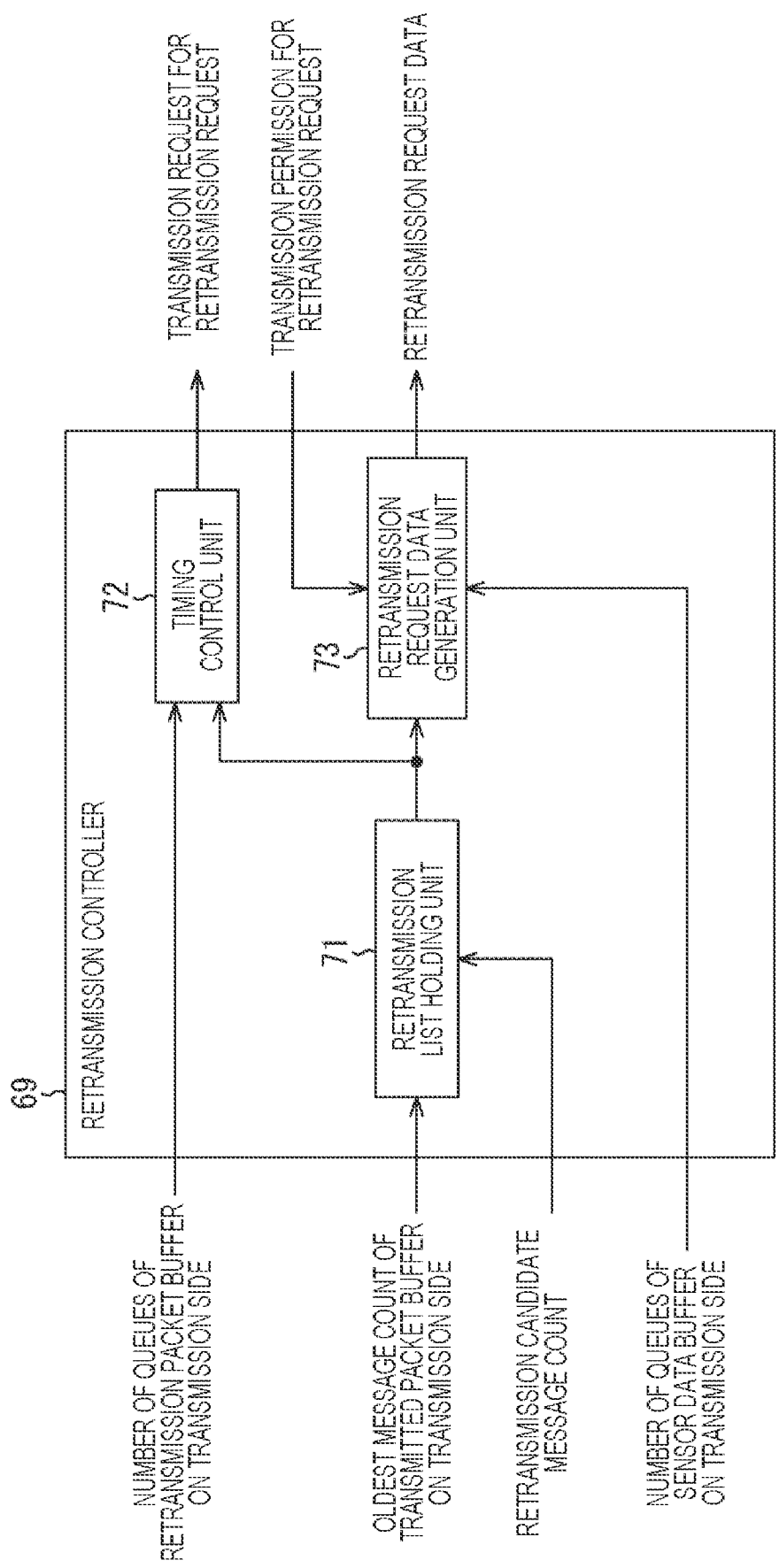
FIG. 13 is a block diagram illustrating a configuration example of a retransmission controller.
Figure 14:
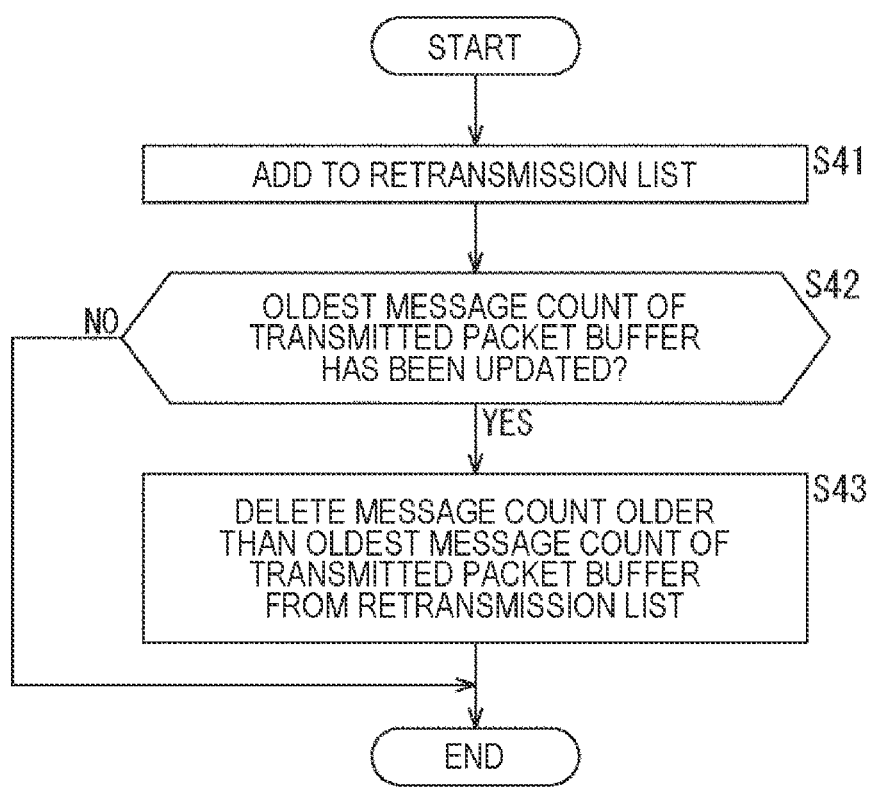
FIG. 14 is a flowchart for explaining a process of managing a retransmission list.
Figure 15:
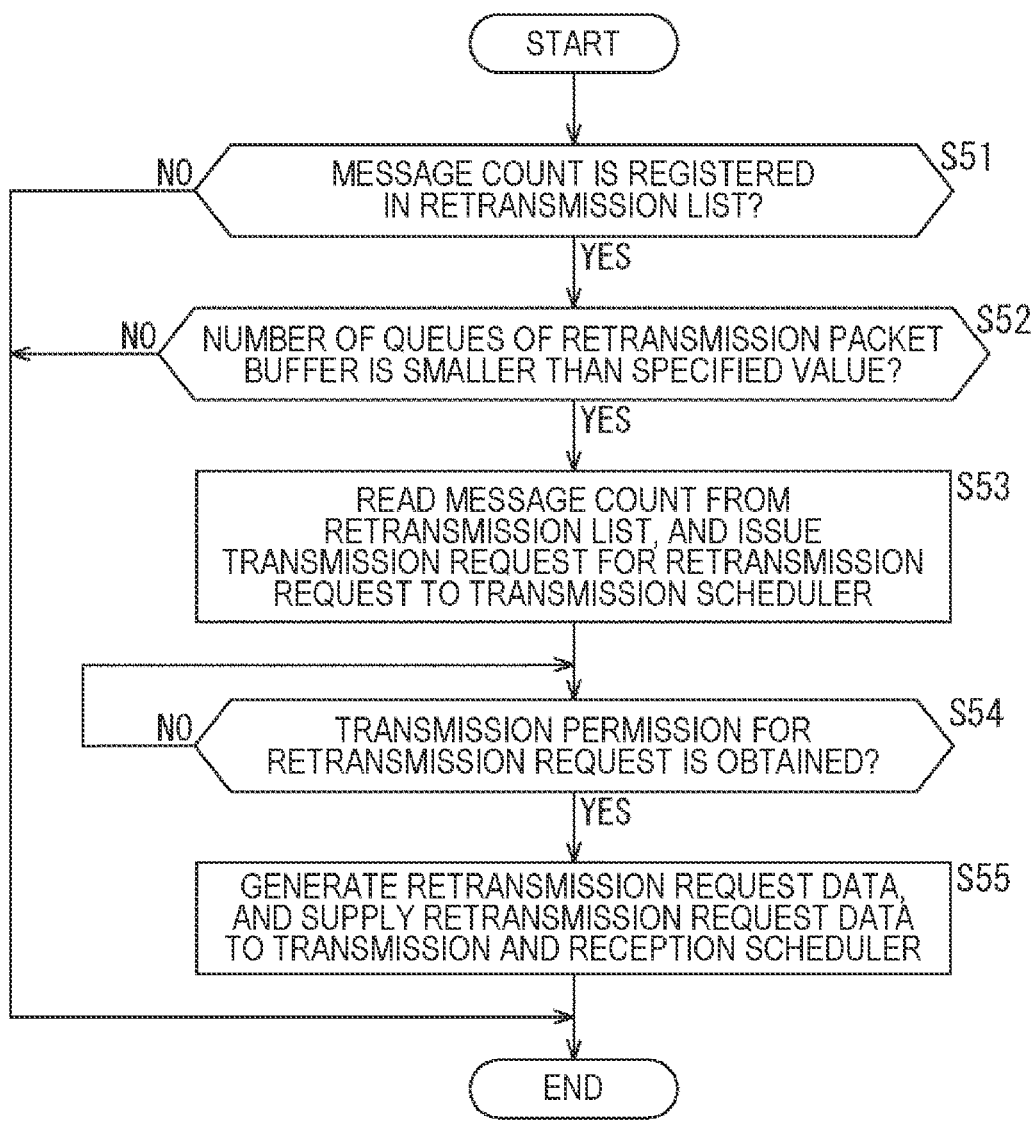
FIG. 15 is a flowchart for explaining a process of transmitting retransmission request data.

With reference to FIGS. 13 to 15, descriptions will be given of a configuration example of the retransmission controller 69 and a processing example of the retransmission request process.

FIG. 13 is a block diagram illustrating a configuration example of the retransmission controller 69.

As illustrated is FIG. 13, the retransmission controller 69 includes a retransmission list holding unit 71, a timing control unit 72, and a retransmission request data generation unit 73.

Here, the retransmission controller 69 is supplied with, for example, various types of information that are embedded in the header of the transmission packet and transmitted. For example, information indicating the number of queues of a retransmission packet buffer 65 (FIG. 16) of the transmitted buffer 56, information indicating the oldest message count of a transmitted packet buffer 84 (FIG. 16) of the transmitted buffer 56, and information indicating the number of queues of a sensor data buffer 91 (FIG. 21) of the transmission scheduler 57 are used as the information.

The retransmission list holding unit 71 holds a retransmission list in which a message count of a packet for which retransmission is requested is registered, and manages the retransmission list. For example, the retransmission list holding unit 71 manages the retransmission list so that only a message count is registered newer than the oldest message count held in the transmitted buffer 56 among the retransmission candidate message counts detected by the retransmission detector 68.

For example, it is assumed that, when message counts 98 to 102 are registered in the retransmission list in accordance with the retransmission candidate message counts, the message count 100 is newly supplied as the oldest message count of the transmitted packet buffer 84 of the transmitted buffer 56. In this case, the retransmission list holding unit 71 deletes the message counts 98 and 99 older than the message count 100 from the retransmission list, whereby only the message counts 100 to 102 newer than the message count 100 is registered in the retransmission list. Note that, a process in which the retransmission list holding unit 71 manages the retransmission list will be described later with reference to a flowchart of FIG. 14.

The timing control unit 72 controls a timing at which the transmitted packet corresponding to the message count registered in the retransmission list of the retransmission list holding unit 71 is retransmitted as the retransmission packet on the basis of the number of queues of the retransmission packet buffer 85 of the transmitted buffer 56. For example, in a case where the message count is registered in the retransmission list and the number of queues of the retransmission packet buffer 85 of the transmitted buffer 56 is smaller than a specified value, the timing control unit 72 reads the message count from the retransmission list of the retransmission list holding unit 71. Then, the timing control unit 72 issues a transmission request for a retransmission request for the transmitted packet corresponding to the read message count to the transmission and reception scheduler 65.

In a case where the transmission permission is obtained from the transmission and reception scheduler 65 for the transmission request issued by the timing control unit 72, the retransmission request data generation unit 73 generates retransmission request data for requesting retransmission of a transmitted packet corresponding to the message count read from the retransmission list of the retransmission list holding unit 71, and supplies the retransmission request data to the transmission and reception scheduler 65. At this time, the retransmission request data generation unit 73 obtains a retransmission frequency indicating a frequency of transmission of a retransmission packet for transmission of a new packet on the basis of the number of queues of the sensor data buffer 91 of the transmission scheduler 57, and gives the retransmission request data to the retransmission frequency. For example, the retransmission request data generation unit 73 can obtain the retransmission frequency so that the retransmission frequency decreases if the number of queues of the sensor data buffer 91 of the transmission scheduler 57 is large, and the retransmission frequency increases if the number of queues of the sensor data buffer 91 of the transmission scheduler 57 is small.

With reference to a flowchart illustrated in FIG. 14, a description will be given of a process in which the retransmission list holding unit 71 manages the retransmission list.

For example, when notification of a retransmission candidate message count is performed from the retransmission detector 68, the process is started, and in step S41, the retransmission list holding unit 71 adds, to the retransmission list, the message count of which notification is performed as the retransmission candidate message count.

In step S42, the retransmission list holding unit 71 determines whether or not the oldest message count of the transmitted packet buffer 84 of the transmitted buffer 56 has been updated. For example, when information indicating the oldest message count of the transmitted packet buffer 84 of the transmitted buffer 56 is newly supplied, the retransmission list holding unit 71 determines that the information has been updated.

In step S42, in a case where the retransmission list holding unit 71 determines that the oldest message count of the transmitted packet buffer 84 of the transmitted buffer 56 has been updated, the process proceeds to step S43.

In step S43, the retransmission list holding unit 71 deletes a message count older than the oldest message count of the transmitted packet buffer 84 of the transmitted buffer 56 from among the message counts registered in the retransmission list.

After the process of step S43 or in a case where it is determined in step S42 that the oldest message count of the transmitted packet buffer 84 of the transmitted buffer 56 has not been updated, the process is ended.

As described above, the retransmission list holding unit 71 can manage the retransmission list so that only a message count newer than the oldest message count of the transmitted packet buffer 84 of the transmitted buffer 56 is registered. As a result, it is possible to avoid that a message count of a transmitted packet not held in the transmitted buffer 56 is registered in the retransmission list, and to prevent requesting transmission, as the retransmission packet, of the transmitted packet not held in the transmitted buffer 56 from being performed.

With reference to a flowchart illustrated in FIG. 15, a description will be given of a process of transmitting retransmission request data by the timing control unit 72 and the retransmission request data generation unit 73.

For example, when the transmission and reception scheduler 65 enters an empty state, the process is started, and in step S51, the timing control unit 72 determines whether or not a message count is registered in the retransmission list held by the retransmission list holding unit 71. In step S51, in a case where the timing control unit 72 determines that the message count is registered in the retransmission list held by the retransmission list holding unit 71, the process proceeds to step S52.

In step S52, the timing control unit 72 determines whether or not the number of queues of the retransmission packet buffer 85 of the transmitted buffer 56 is smaller than, the specified value. In step S52, in a case where the timing control unit 72 determines that the number of queues of the retransmission packet buffer 85 of the transmitted buffer 56 is smaller than the specified value, the process proceeds to step S53.

In step S53, the timing control unit 72 reads the message count from the retransmission list held by the retransmission list holding unit 71, and issues a transmission request for a retransmission request to the transmission and reception scheduler 65.

In step S54, the retransmission request data generation unit 73 determines whether or not a transmission permission is obtained from the transmission and reception scheduler 65 for the transmission request in step S53, and waits for the process until the transmission permission is obtained.

In step S54, in a case where the retransmission request data generation unit 73 determines that the transmission permission is obtained from the transmission and reception scheduler 65, the process proceeds to step S55. In step S55, the retransmission request data generation unit 73 generates retransmission request data for requesting retransmission of a transmitted packet corresponding to the message count read from the retransmission list of the retransmission list holding unit 71, gives a retransmission frequency to the retransmission request data, and supplies the retransmission request data to the transmission and reception scheduler 65.

After the process of step S55, in a case where it is determined in step S51 that the message count is not registered in the retransmission list held by the retransmission list holding unit 71, or in a case where it is determined in step S52 that the number of queues of the retransmission packet buffer 85 of the transmitted buffer 56 is not smaller (that is, larger) than the specified value, the process is ended.

As described above, the timing control unit 72 considers the number of queues of the retransmission packet buffer 85 of the transmitted buffer 56, and waits for a request for retransmission of the transmitted packet in a case where the number of queues is larger than the specified value. As a result, for example, overflow of the retransmission packet buffer 85 of the transmitted buffer 56 by the retransmission packet can be avoided, and the transmitted packet can be retransmitted more efficiently. Furthermore, by giving the retransmission frequency to the retransmission request data and adjusting the frequency, of transmission of the retransmission packet for transmission of the new packet, for example, it is possible to avoid delay of transmission of the new packet due to transmission of the retransmission packet.

<Configuration Example of Transmitted Buffer and Processing Example of Retransmission Reception Process>

With reference to FIGS. 16 to 20, descriptions will be given of a configuration example of the transmitted buffer 56 and the retransmission reception process.

Figure 16:
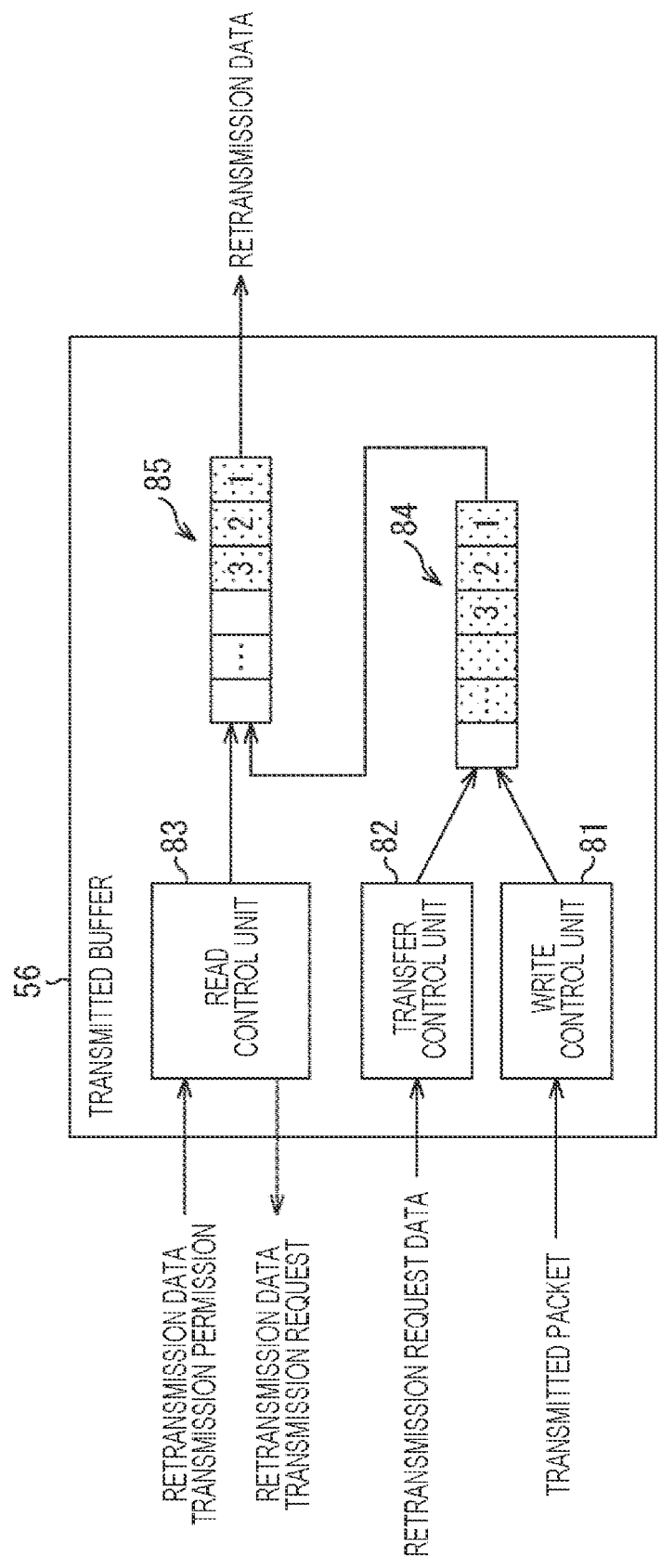
FIG. 16 is a block diagram illustrating a first configuration example of a transmitted buffer.

FIG. 16 is a block diagram illustrating a first configuration example of the transmitted buffer 56.

As illustrated in FIG. 16, the transmitted buffer 56 includes a write control unit 81, a transfer control unit 82, a read control unit 83, the transmitted packet buffer 84, and the retransmission packet buffer 85. That is, the transmitted buffer 56 adopts a double buffer structure including two buffers of the transmitted packet buffer 84 and the retransmission packet buffer 85.

The write control unit 81 performs write control to write the transmitted packet supplied from the transmission scheduler 57 in the transmitted packet buffer 84.

The transfer control unit 82 searches for a transmitted packet of a message count specified by the retransmission request data supplied from the control data identifier 55 from among the transmitted packets held in the transmitted packet buffer 84. Then, in a case where the transmitted packet of the message count specified by the retransmission request data can be acquired as a search result, the transfer control unit 82 performs transfer control to transfer the transmitted packet to the retransmission packet buffer 85. Note that, in a case where the transmitted packet of the message count specified by the retransmission request data cannot be acquired as the search result, the transfer control unit 82 discards the retransmission request data.

The read control unit 83 manages an address of the retransmission packet held by the retransmission packet buffer 85, and issues a retransmission data transmission request for requesting transmission of the retransmission packet held by the retransmission packet buffer 85, to the transmission scheduler 57. Then, when the retransmission data transmission permission is obtained from the transmission scheduler 57, the read control unit 83 performs read control to read the retransmission packet from the retransmission packet buffer 85 and supply the retransmission packet to the transmission scheduler 57.

The transmitted packet buffer 84 holds the transmitted packet, and the retransmission packet buffer 85 holds the retransmission packet.

Figure 17:
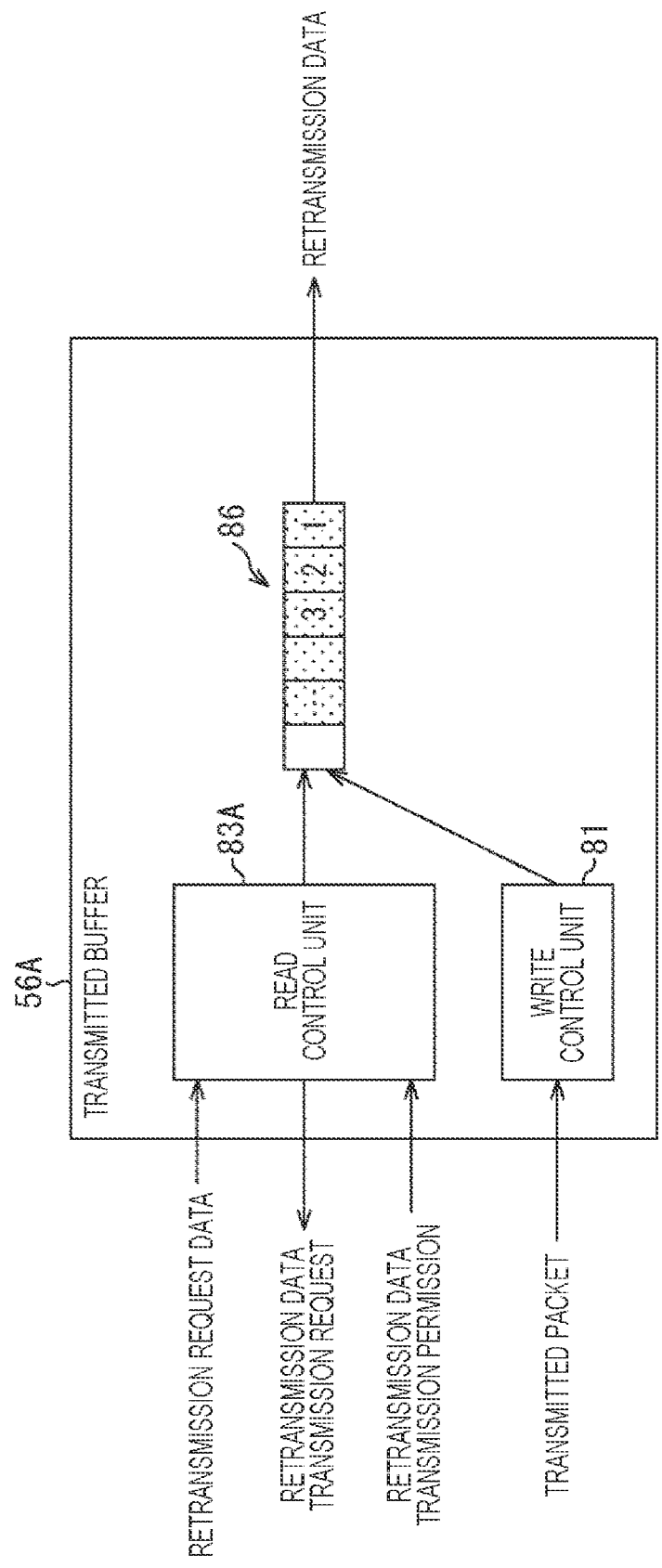
FIG. 17 is a block diagram illustrating a second configuration example of the transmitted buffer.

FIG. 17 is a block diagram illustrating a second configuration example of the transmitted buffer 56.

As illustrated in FIG. 17, a transmitted buffer 56A includes the write control unit 81, a read control unit 83A, and a transmitted packet and retransmission packet buffer 86. That is, the transmitted buffer 56A adopts a single buffer structure including only one transmitted packet and retransmission packet buffer 86.

The write control unit 81 performs write control to write the transmitted packet supplied from the transmission scheduler 57 in the transmitted packet and retransmission packet buffer 86.

The read control unit 83A searches for a transmitted packet of a message count specified by the retransmission request data supplied from the control data identifier 55 from among the transmitted packets held by the transmitted packet and retransmission packet buffer 86. Then, in a case where the transmitted packet of the message count specified by the retransmission request data can be acquired as a search result, the read control unit 83A performs address management in which the transmitted packet is set as a retransmission packet. Note that, in a case where the transmitted packet of the message count specified by the retransmission request data cannot be acquired as the search result, the read control unit 83A discards the retransmission request data.

Moreover, the read control unit 83A issues a retransmission data transmission request for requesting transmission of the transmitted packet held by the transmitted packet and retransmission packet buffer 86, to the transmission scheduler 57. Then, when the retransmission data transmission permission is obtained from the transmission scheduler 57, the read control unit 83A performs read control to read the retransmission packet from the transmitted packet and retransmission packet buffer 86 and supply the retransmission packet to the transmission scheduler 57.

The transmitted packet and retransmission packet buffer 86 holds the transmitted packet and the retransmission packet.

Here, with reference to FIG. 18, a description will be given of a memory structure of the transmitted packet and retransmission packet buffer 86.

Figure 18:
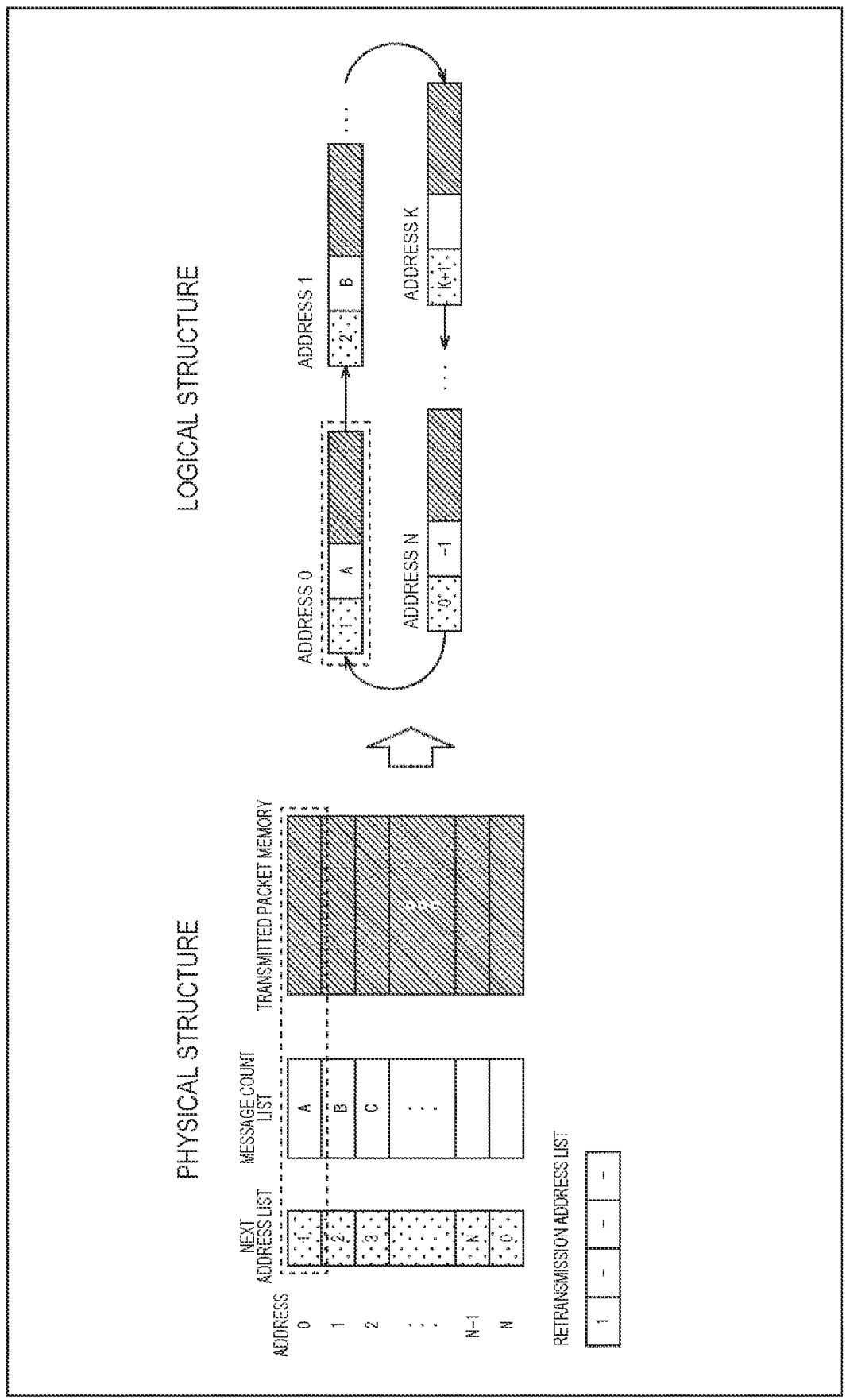
FIG. 18 is a diagram for explaining a memory structure of the transmitted buffer.

As illustrated on the left side of FIG. 18, in a physical structure of the transmitted packet and retransmission packet buffer 86, a next address list, a message count list, and a transmitted packet memory are provided for each address identified by address numbers 0 to N. Furthermore, a retransmission address list is provided separately from them.

The next address list stores an address number of an address to which the next transmitted packet is to be written when the transmitted packet is written to the address.

The message count list stores the same message count as that of the packet stored in the transmitted packet memory. As a result, for example, at the time of receiving a retransmission request, even when the transmitted packet memory is during a write access, it is possible to perform a search using the message count stored in the message count list.

The transmitted packet memory stores data of the transmitted packet.

The retransmission address list stores an address number of an address that is a storage destination of a transmitted packet that matches the message count specified by the retransmission request data. Then, overwriting is prohibited on the address with the address number stored in the retransmission address list. Here, in the transmitted packet and retransmission packet buffer 86, the number of registrations of the message count registered in the retransmission address list corresponds to the number of queues of the retransmission packet buffer 85 of the transmitted buffer 56 in FIG. 16.

Furthermore, as illustrated on the right side of FIG. 18, a logical structure of the transmitted packet and retransmission packet buffer 86 is configured as a linked list in which structures each having a next address, a message count, and a transmitted packet as one set are linked in accordance with the next address.

Figure 19:
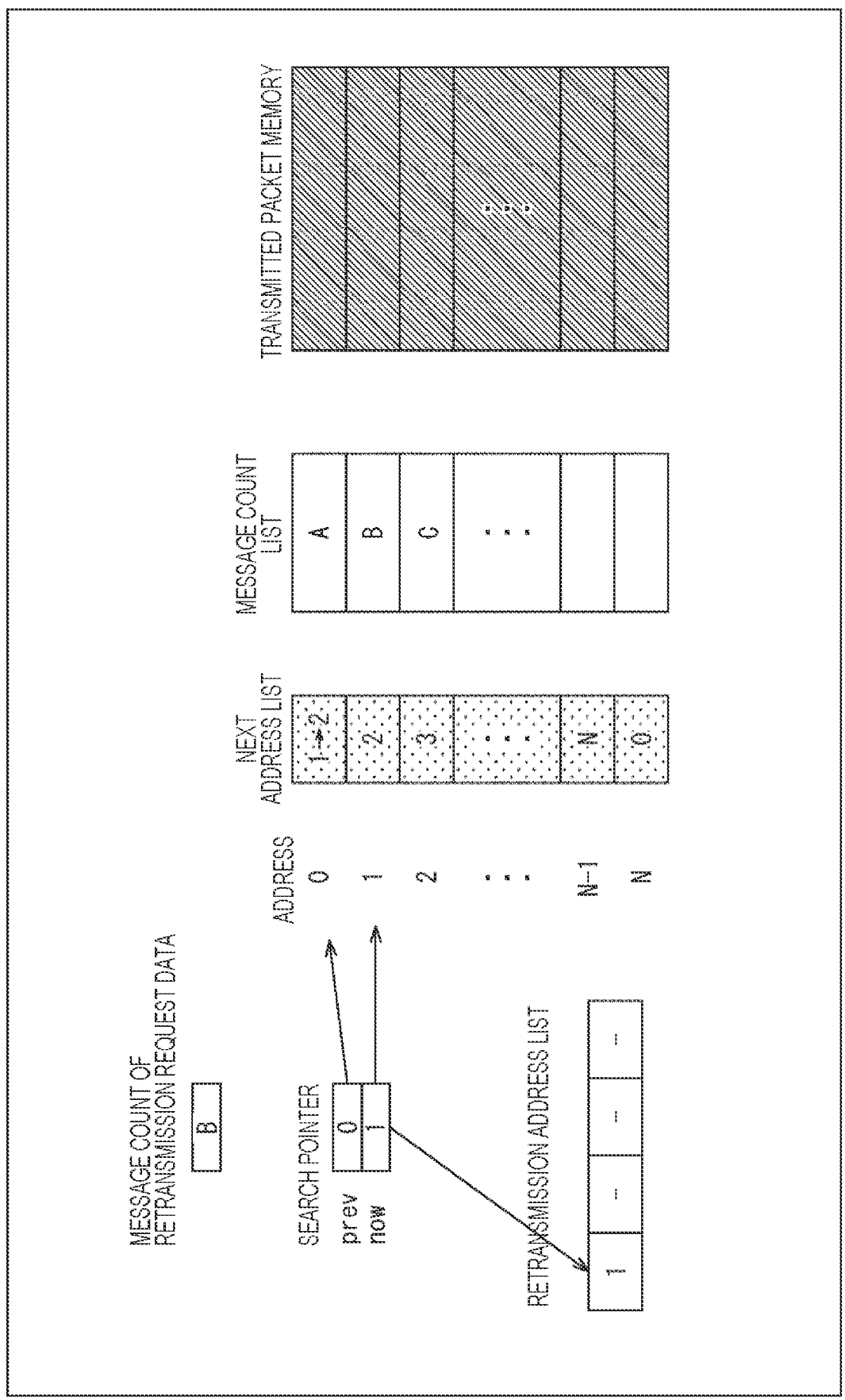
FIG. 19 is a diagram for explaining processing when a transmitted packet for which retransmission is requested is obtained as a search result.

FIG. 19 describes an example of a process when a transmitted packet that matches the message count specified by the retransmission request data in the transmitted buffer 56A is obtained as a search result.

For example, it is assumed that, when a now pointer of a search pointer indicates the address number 1, a search is performed for a message count B specified by the retransmission request data, and is obtained as a search result that a transmitted packet that matches the message count 78 stored in an address with the address number 1.

At this time, first, an address number stored in the next address of an address with an address number indicated by the now pointer of the search pointer is set for the next address of an address with an address number indicated by a prev pointer of the search pointer. That is, in the example illustrated in FIG. 19, it is illustrated that the address number 2 stored in the next address of the address with the address number 1 indicated by the now pointer of the search pointer is set for the next address (at the present time, the address number 1) of an address with the address number 0 indicated by the prev pointer of the search pointer.

Next, the address number indicated by the now pointer of the search pointer is registered in the retransmission address list. That is, in the example illustrated in FIG. 19, it is illustrated that the address number 1 indicated by the now pointer of the search pointer is registered in the retransmission address list.

As described above, in the transmitted packet and retransmission packet buffer 86, the transmitted packet for which retransmission is requested is subjected to address management as a retransmission packet, and overwriting on the retransmission packet is prohibited. That is, in the example illustrated in FIG. 19, it is illustrated that overwriting is prohibited on the address with the address number 1 in which the transmitted packet with the message count B is stored in the transmitted packet buffer.

Figure 20:
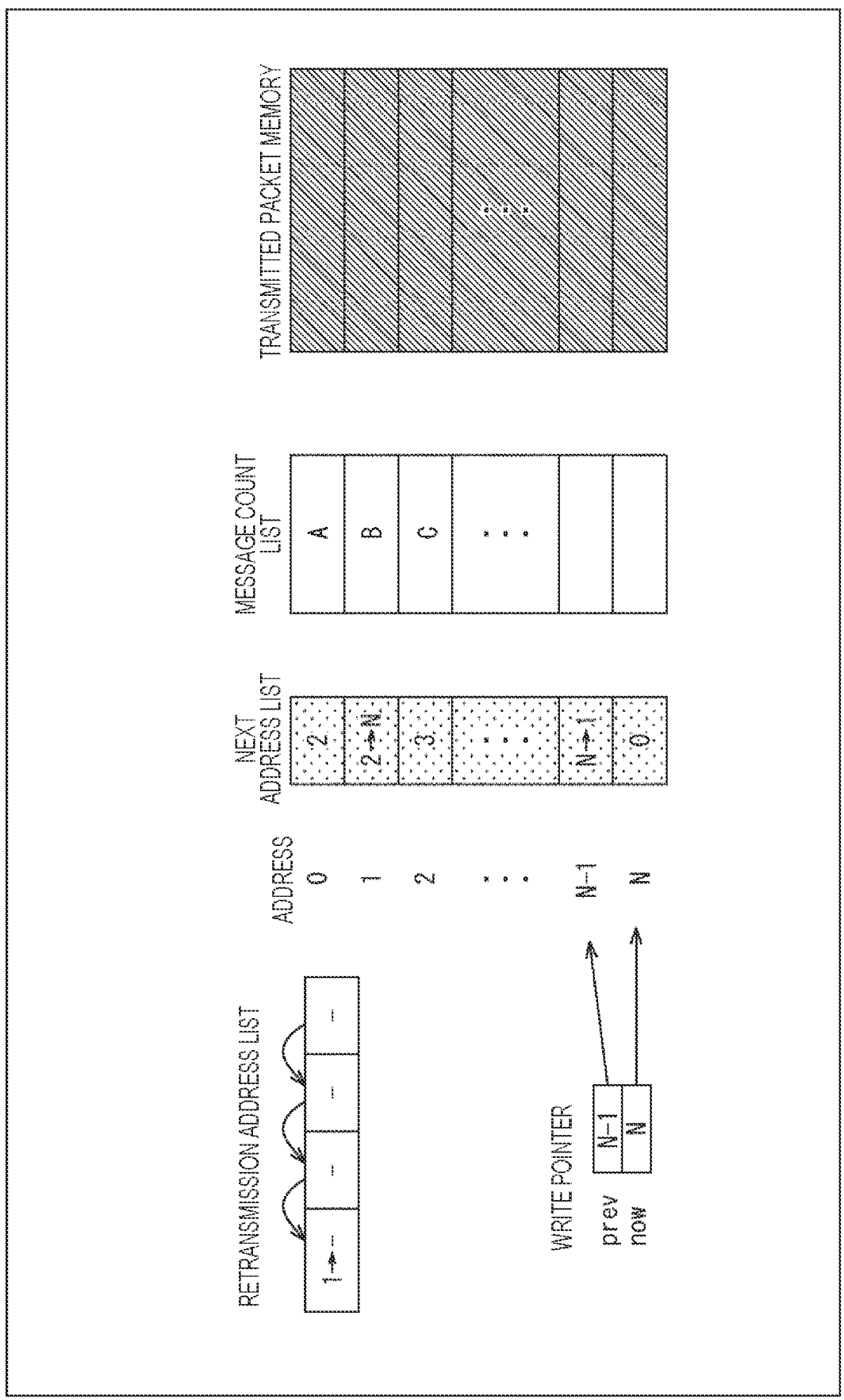
FIG. 20 is a diagram for explaining processing when the transmitted packet is retransmitted.

FIG. 20 is a diagram for explaining an example of a process when the transmitted packet is retransmitted that is stored in a transmitted packet memory of the address with the address number stored in the retransmission address list in the transmitted buffer 56A.

For example, it is assumed that, when a now pointer of a write pointer is updated to indicate the address number N (here, the address number N is the oldest address number), retransmission has occurred of the transmitted packet of the address with the address number 1 stored in the retransmission address list.

At this time, first, an address number indicated by the now pointer of the write pointer is set for the next address of an address of a transmitted packet for which retransmission has occurred. That is, in the example illustrated in FIG. 20, it is illustrated that the address number N indicated by the now pointer of the write pointer is set for the next address (at the present time, the address number 2) of the address with the address number 1 stored in the retransmission address list.

Then, next, an address number of a transmission queue is set for the next address of an address number indicated by the prev pointer of the write pointer. That is, in the example illustrated in FIG. 20, the address number 1 of the transmission queue is set for the next address of an address with the address number N−1 indicated by the prev pointer of the write pointer.

As described above, in the transmitted packet and retransmission packet buffer 86, when the transmitted packet is retransmitted as the retransmission packet, address management is performed so that it becomes possible to perform overwriting on the address of the transmitted packet memory in which the transmitted packet is stored. That is, in the example illustrated in FIG. 19, it is illustrated that the transmitted packet with the message count B is transmitted as the retransmission packet, and it becomes possible to perform overwriting on the address with the address number 1 in which the transmitted packet with the message count B is stored.

The single buffer structure of the transmitted buffer 56A configured as described above is advantageous as compared with the double buffer structure of the transmitted buffer 56 in FIG. 16 in which address control becomes complicated.

That is, since rewriting of the retransmission packet (transfer control as in the transmitted buffer 56) does not occur in the transmitted buffer 56A, it is avoided that a packet having the same content is written in the transmitted packet memory, and the memory can be efficiently used. Note that, here, it is described as the packet having the same content; however, strictly speaking, the message count needs to be updated at the time of retransmission, and thus the retransmission data is not completely the same.

Furthermore, since reading is performed on the buffer at the time of retransmission and writing is performed on the buffer at the time of normal transmission, reading and writing are exclusive operations, so that the transmitted packet and retransmission packet buffer 86 can include a single-port RAM. Moreover, a retransmission packet buffer length can be adjusted within a transmitted packet buffer length, and flexibility can be increased.

<Configuration Example of Transmission Scheduler>

Figure 21:
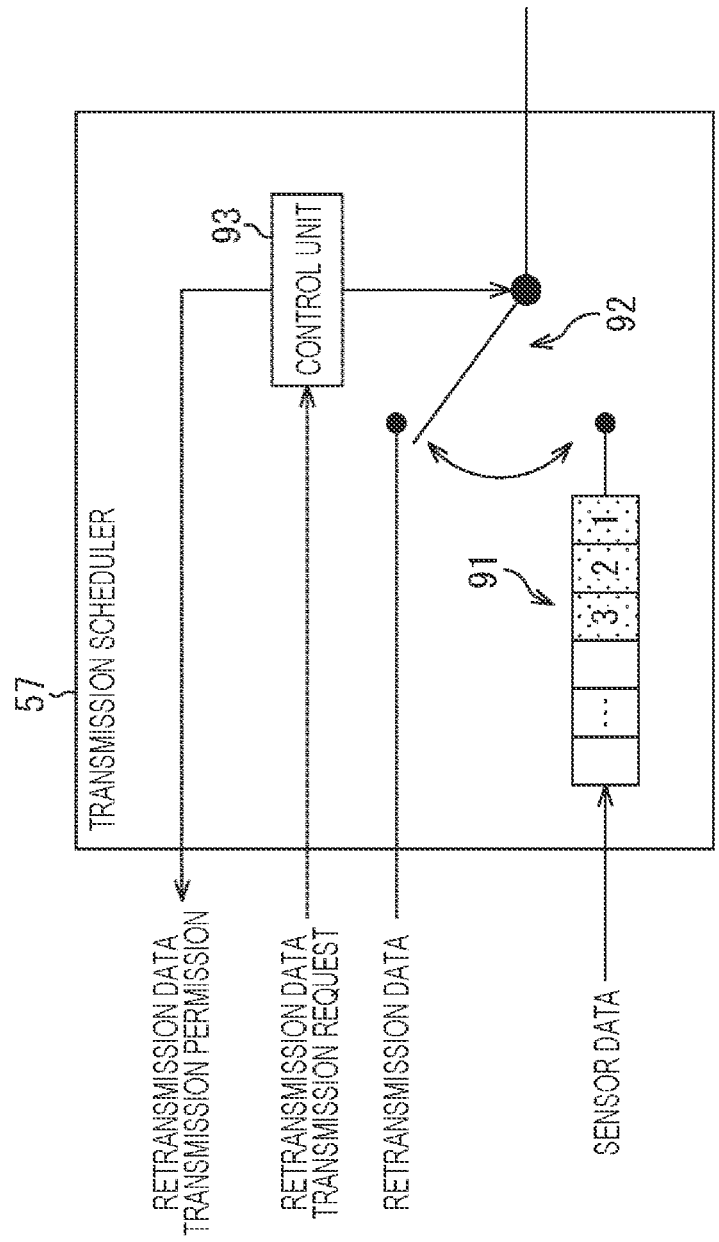
FIG. 21 is a block diagram illustrating a configuration example of a transmission scheduler.

FIG. 21 is a block diagram illustrating a configuration example of the transmission scheduler 57.

As illustrated in FIG. 21, the transmission scheduler 57 includes the sensor data buffer 91, a switching unit 92, and a control unit 93.

The sensor data buffer 91 temporarily stores, for example, a new packet in which sensor data newly input from an imaging element (not illustrated) included in the image sensor 21 is stored in the payload. For example, the sensor data buffer 91 is necessary since it is assumed that the new packet in which sensor data is stored in the payload is input during output of the retransmission packet supplied from the transmitted buffer 56.

The switching unit 92 switches between the new packet stored in the sensor data buffer 91 and the retransmission packet supplied from the transmitted buffer 56 in accordance with control by the control unit 93, and outputs the packet from the transmission scheduler 57.

The control unit 93 acquires the retransmission data transmission request issued from the transmitted buffer 56, gives the retransmission data transmission permission to the transmitted buffer 56 in accordance with the retransmission frequency, included in the retransmission data transmission request, and controls switching of the output by the switching unit 92. For example, in a case where the number of queues of the sensor data buffer 91 of the transmission scheduler 57 is large, the control unit 93 controls the switching of the our by the switching unit 92 so that the retransmission frequency is low and the transmission of the retransmission packet is reduced. On the other hand, in a case where the number of queues of the sensor data buffer 91 of the transmission scheduler 57 is small, the switching of the output by the switching unit 92 is controlled so that the retransmission frequency is high and the number of retransmission packets is increased.

The transmission scheduler 57 is configured as described above, and can control the transmission of the new packet and the retransmission packet so that the frequency of the transmission of the retransmission packet with respect to the transmission of the new packet is appropriate, for example, so that the new packet does not overflow in the sensor data buffer 91.

<Implementation Example of Image Sensor and Application Processor>

With reference, to FIGS. 22 to 25, descriptions will be given of implementation examples of the image sensor 21 and the application processor 31.

Figure 22:
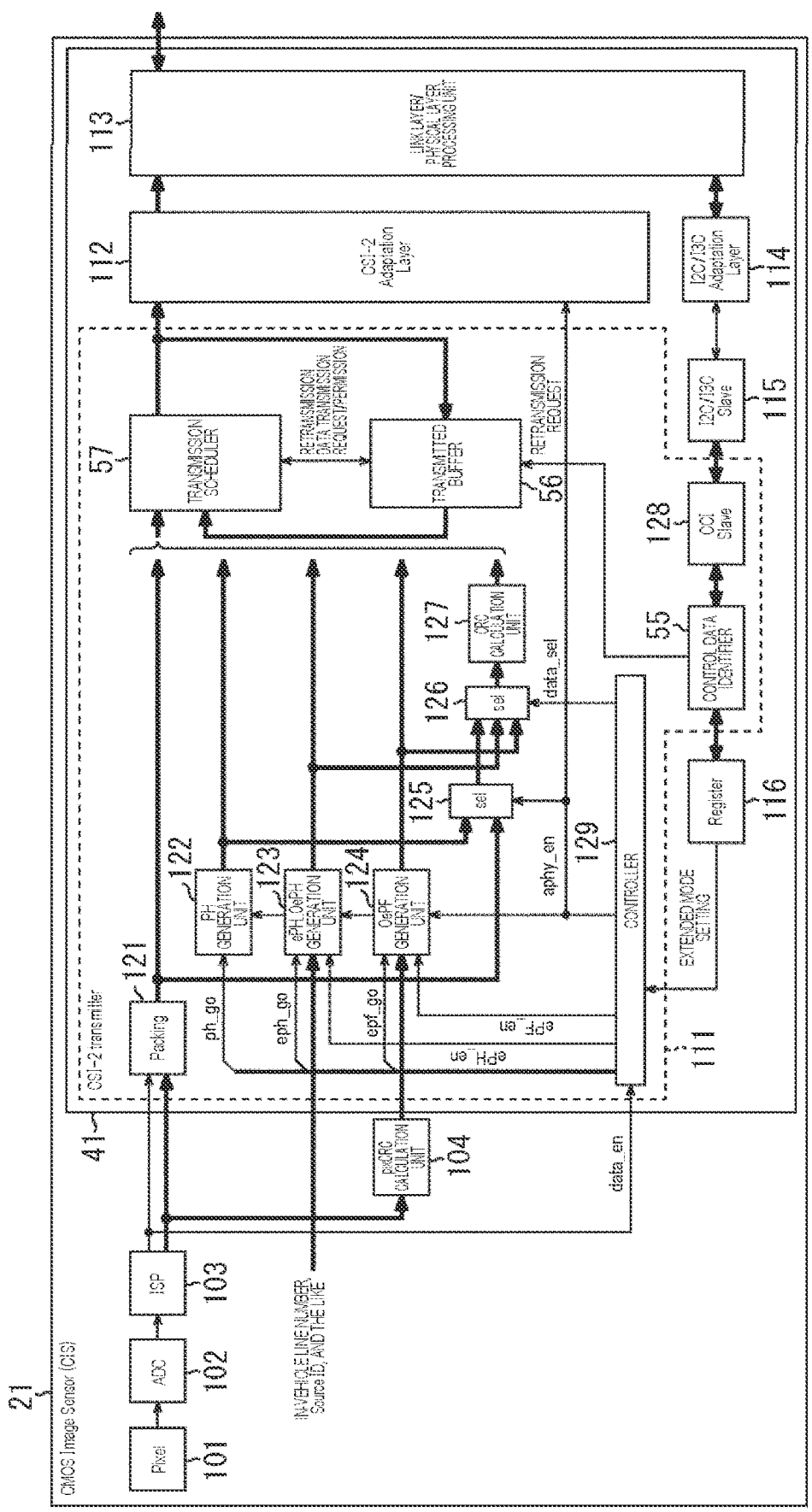
FIG. 22 is a diagram illustrating a first implementation example of an image sensor.

FIG. 22 illustrates a first implementation example of the image sensor 21.

The image sensor 21 illustrated in FIG. 22 includes the transmission-side communication device 41, and includes a pixel 101, an AD converter 102, an image processing unit 103, and a pixel CRC calculation unit 104. Furthermore, the transmission-side communication device 41 includes a CSI-2 transmitter 111, a CSI-2 adaptation layer 112, a link layer/physical layer processing unit 113, an I2C/I3C adaptation layer 114, an I2C/I3C slave 115, and a register 116.

Then, the CSI-2 transmitter 111 is adaptable to the extended CSI-2, and includes a packing unit 121, a packet header generation unit 122, a payload header generation unit 123, a payload footer generation unit 124, selection units 125 and 126, a CRC calculation unit 127, a CCI slave 128, and a controller 129. Moreover, the CSI-2 transmitter 111 includes the control data identifier 55, the transmitted buffer 56, and the transmission scheduler 57 illustrated in FIG. 3.

As described above, the transmission-side communication device 41 can implement retransmission for each packet by mounting the control data identifier 55, the transmitted buffer 56, and the transmission scheduler 57 in the CSI-2 transmitter 111.

Figure 23:
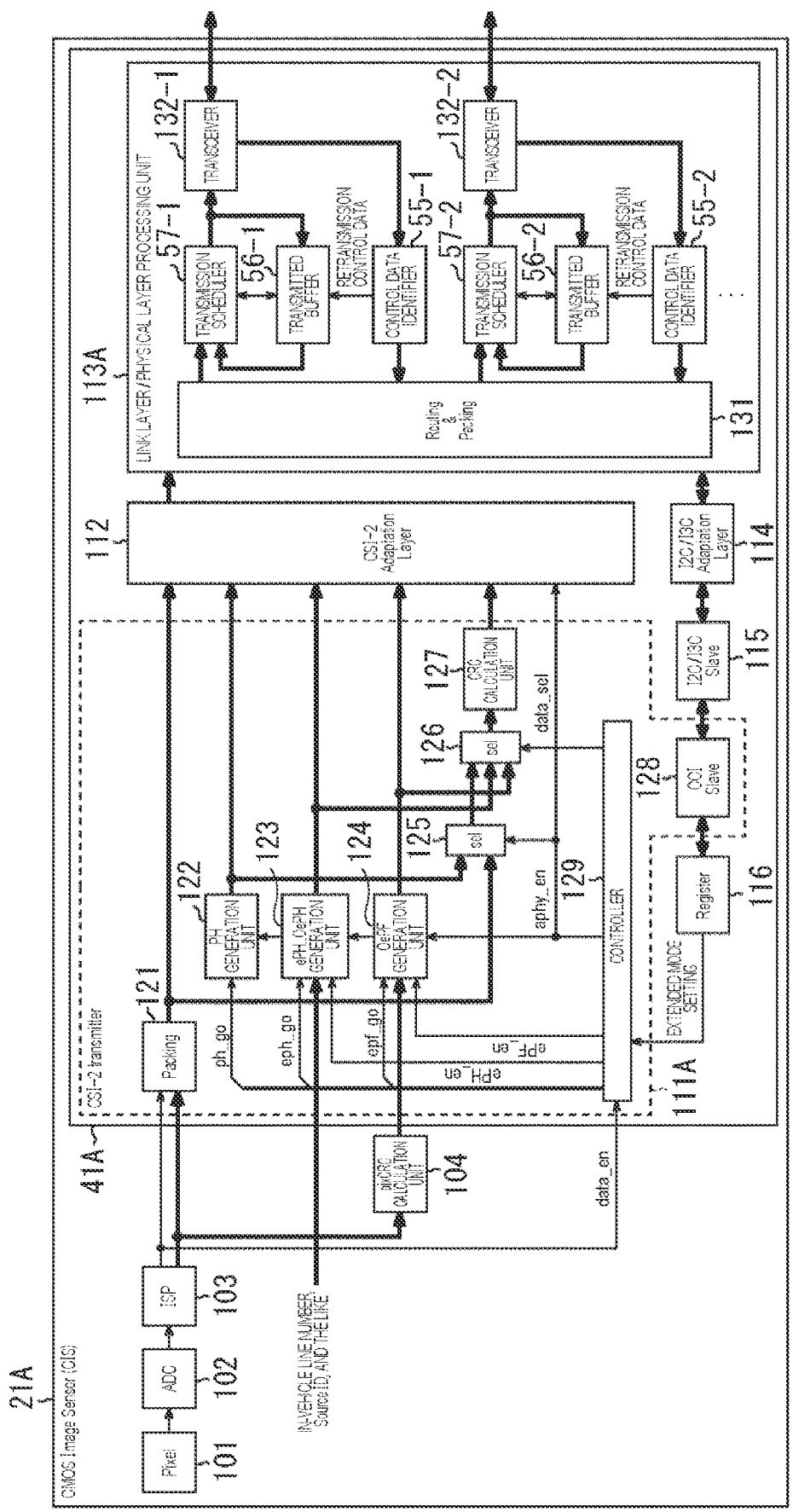
FIG. 23 is a diagram illustrating a second implementation example of the image sensor.

FIG. 23 illustrates a second implementation example of an image sensor 21A.

The image sensor 21A illustrated in FIG. 23 includes a transmission-side communication device 41A, and includes the pixel 101, the AD converter 102, the image processing unit 103, and the pixel CRC calculation unit 104. Furthermore, the transmission-side communication device 41A includes a CSI-2 transmitter 111A, the CSI-2 adaptation layer 112, a link layer/physical layer processing unit 113A, the I2C/I3C adaptation layer 114, the I2C/I3C slave 115, and the register 116.

Furthermore, the CSI-2 transmitter 111A includes the packing unit 121, the packet header generation unit 122, the payload header generation unit 123, the payload footer generation unit 124, the selection units 125 and 126, the CRC calculation unit 127, the CCI slave 128, and the controller 129.

Then, the link layer/physical layer processing unit 113A includes a routing and packing unit 131 and a transceiver 132, and further includes the control data identifier 55, the transmitted buffer 56, and the transmission scheduler 57 illustrated in FIG. 3. Note that, the transceiver 132, the control data identifiers 55, the transmitted buffers 56, and the transmission schedulers 57 are arranged in parallel in the number corresponding to the number of lanes (for example, four) to communicate with the reception-side communication device 42.

As described above, the transmission-side communication device 41A can implement retransmission for each packet by mounting the control data identifier 55, the transmitted buffer 56, and the transmission scheduler 57 in the link layer/physical layer processing unit 113A.

Figure 24:
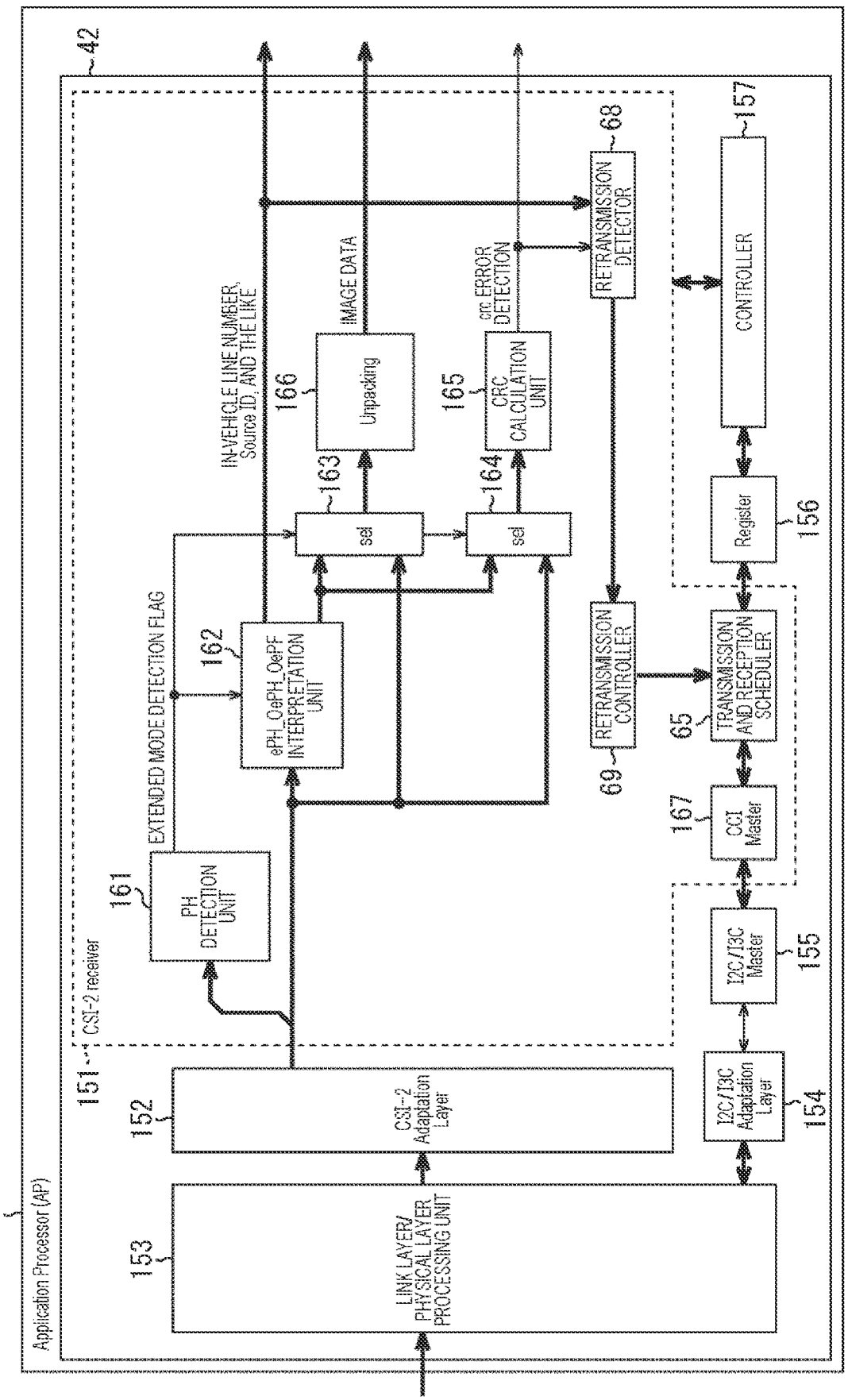
FIG. 24 is a diagram illustrating a first implementation example of an application processor.

FIG. 24 illustrates a first implementation example of the application processor 31. Note that, in the application processor 31 illustrated in FIG. 24, illustration is omitted of blocks constituting devices other than the reception-side communication device 42.

As illustrated in FIG. 24, the reception-side communication device 42 includes a CSI-2 receiver 151, a CSI-2 adaptation layer 152, a link layer/physical layer processing unit 153, an I2C/I3C adaptation layer 154, an I2C/I3C master 155, a register 156, and a controller 157.

Then, the CSI-2 receiver 151 is adaptable to the extended CSI-2, and includes a packet header detection unit 161, an interpretation unit 162, selection units 163 and 164, a CRC calculation unit 165, an unpacking unit 166, and a CCI master 167. Moreover, the CSI-2 receiver 151 includes the transmission and reception scheduler 65, the retransmission detector 68, and the retransmission controller 69 illustrated in FIG. 3.

As described above, the reception-side communication device 42 can implement retransmission for each packet by mounting the transmission and reception scheduler 65, the retransmission detector 68, and the retransmission controller 69 in the CSI-2 receiver 151.

Figure 25:
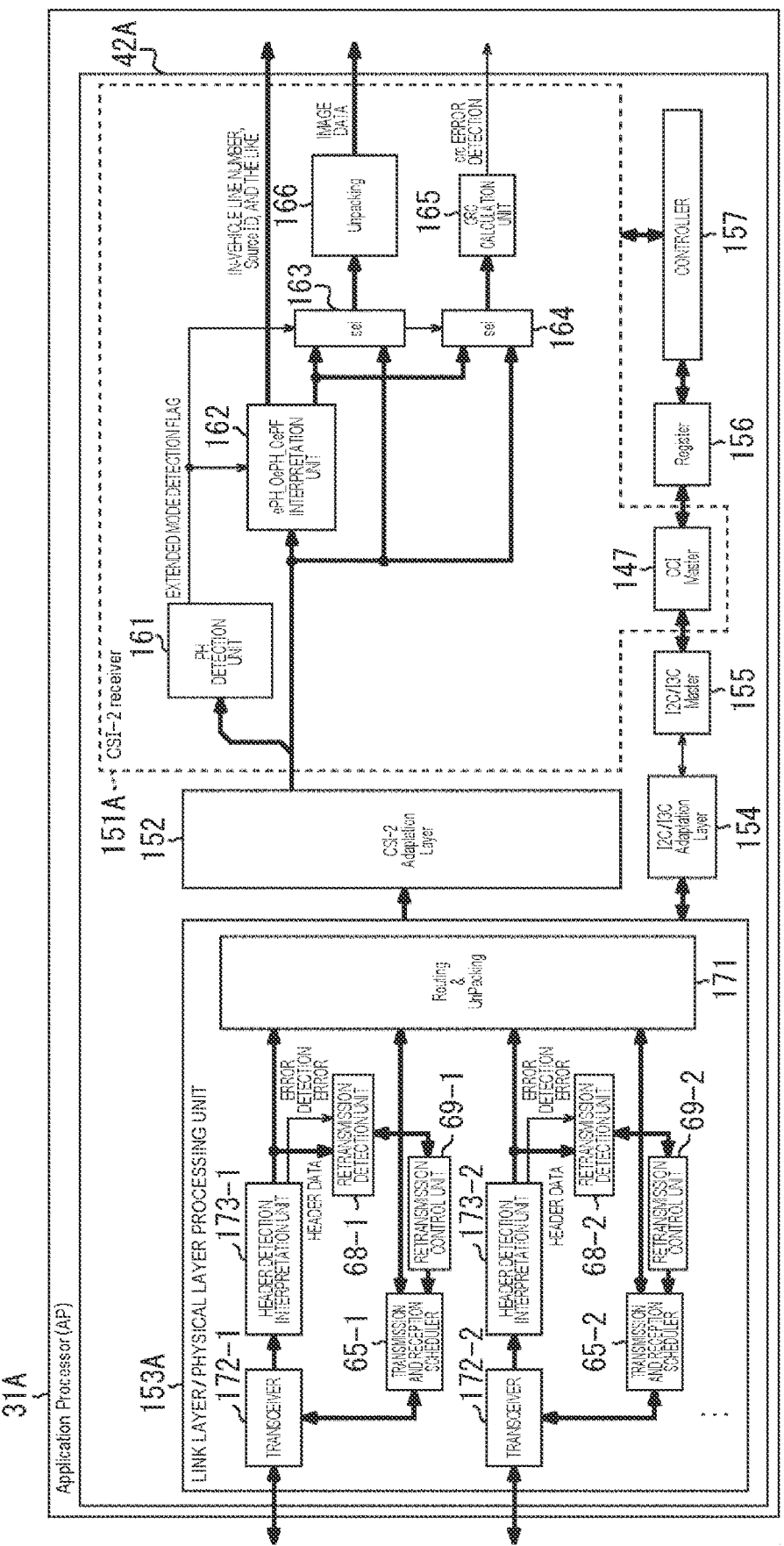
FIG. 25 is a diagram illustrating a second implementation example of the application processor.

FIG. 25 illustrates a second implementation example of an application processor 31A. Note that, in the application processor 31A illustrated in FIG. 25, illustration is omitted of blocks constituting devices other than a reception-side communication device 42A.

As illustrated in FIG. 25, the reception-side communication device 42A includes a CSI-2 receiver 151A, the CSI-2 adaptation layer 152, a link layer/physical layer processing unit 153A, the I2C/I3C adaptation layer 154, the I2C/I3C master 155, the register 156, and the controller 157.

Furthermore, the CSI-2 receiver 151A is adaptable to the extended CSI-2, and includes the packet header detection unit 161, the interpretation unit 162, the selection units 163 and 164, the CRC calculation unit 165, the unpacking unit 166, and the CCI master 167.

Then, the link layer/physical layer processing unit 153A includes a routing and packing unit 171, a transceiver 172, and a header detection interpretation unit 173, and further includes the transmission and reception scheduler 65, the retransmission detector 68, and the retransmission controller 69 illustrated in FIG. 3. Note that, the transceiver 172, the header detection interpretation unit 173, the transmission and reception scheduler 65, the retransmission detector 68, and the retransmission controller 69 are arranged in parallel in the number corresponding to the number of lanes (For example, four) to communicate with the transmission-side communication device 41.

As described above, the reception-side communication device 42A can implement retransmission for each packet by mounting the transmission and reception scheduler 65, the retransmission detector 68, and the retransmission controller 69 in the link layer/physical layer processing unit 153A.

<Configuration Example of Computer>

Figure 26:
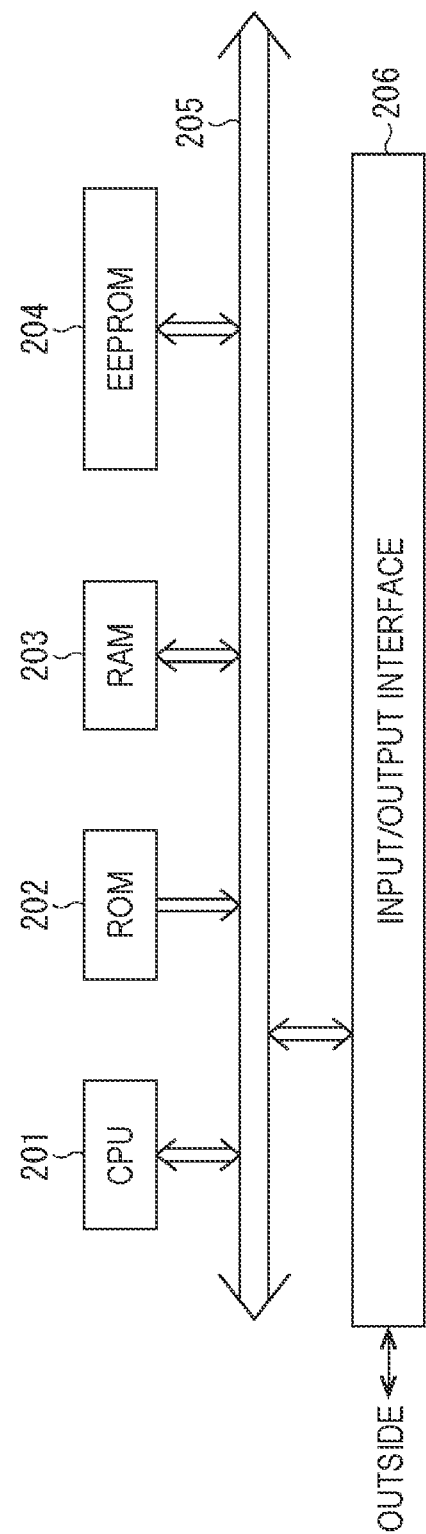
FIG. 26 is a block diagram illustrating a configuration example of an embodiment of a computer to which the present technology is applied.

FIG. 26 is a block diagram illustrating a configuration example of hardware of the computer that executes the above-described series of processing steps by the program.

In the computer, a central processing unit (CPU) 201, a read only memory (ROM) 202, a random access memory (RAM) 203, and an electronically erasable programmable read only memory (EEPROM) 204 are connected to each other by a bus 205. An input/output interface 206 is further connected to the bus 205, and the input/output interface 206 is connected to the outside.

In the computer configured as described above, for example, the CPU 201 loads the program stored in the ROM 202 and the EEPROM 204 to the RAM 203 via the bus 205 to execute the program, whereby the above-described series of processing steps. Furthermore, the program executed by the computer (CPU 201) can be written in the ROM 202 in advance, installed in the EEPROM 204 from the outside via the input/output interface 206, or updated.

Here, in the present specification, the process performed by the computer in accordance with the program does not necessarily have to be performed chronologically in the order described as the flowchart. That is, the process performed by the computer in accordance with the program also includes processes executed in parallel or individually (for example, parallel process or process by an object).

Furthermore, the program may be processed by one computer (processor) or may be distributed and processed by a plurality of computers. Moreover, the program may be transferred to a remote computer and executed.

Moreover, in the present specification, a system means a set of a plurality of constituents (device, module (component), and the like), and it does not matter whether or not all of the constituents are in the same cabinet. Thus, a plurality of devices that is accommodated in a separate cabinet and connected to each other via a network and one device that accommodates a plurality of modules in one cabinet are both systems.

Furthermore, for example, the configuration described as one device (or processing unit) may be divided and configured as a plurality of devices (or processing units). Conversely, configurations described as a plurality of devices (or processing units) in the above may be collectively configured as one device (or processing unit). Furthermore, configurations other than those described above may be added to the configuration of each device (or each processing unit), of course. Moreover, as long as the configuration and operation of the system as a whole are substantially the same, a part of the configuration of a certain device (or processing unit) may be included in the configuration of another device (or another processing unit).

Furthermore, for example, the present technology can adopt a configuration of cloud computing that shares one function in a plurality of devices via a network to process in cooperation.

Furthermore, for example, the program described above can be executed in an arbitrary device. In that case, it is sufficient that the device has a necessary function (functional block, or the like) and can obtain necessary information.

Furthermore, for example, each step described in the above flowchart can be executed by sharing in a plurality of devices, other than being executed by one device. Moreover, in a case where a plurality of pieces of processing is included in one step, the plurality of pieces of processing included in the one step can be executed by sharing in a plurality of devices, other than being executed by one device. In other words, a plurality of pieces of processing included in one step can be executed as processing of a plurality of steps. Conversely, processing described as a plurality of steps can be executed collectively as one step.

Note that, in the program executed by the computer, pieces of processing of steps describing the program may be executed in chronological order along with the order described in this specification, or in parallel, or may be individually executed at necessary timing such as when each step is called. That is, as long as inconsistency does not occur, the processing or each step may be executed in an order different from the order described above. Moreover, the processing of the step describing the program may be executed in parallel with processing of another program, or may be executed in combination with the processing of the other program.

Note that, as long as inconsistency does not occur, each of a plurality of the present technologies described in this specification can be implemented alone independently. Of course, it is also possible to implement by combining any of the plurality of present technologies. For example, a part or all of the present technology described in any of the embodiments can be implemented in combination with a part or all of the present technology described in other embodiments. Furthermore, a part or all of the present technology described above can be implemented in combination with another technology not described above.

<Combination Example of Configurations>

Note that, the present technology can also be configured as described below.

(1)

A communication device including:

a retransmission detection unit that acquires a message count included in a header of a packet transmitted from a communication device on a transmission side via a data channel, and detects the message count of the packet that is a candidate for which retransmission is requested as a retransmission candidate message count; and a retransmission request unit that generates retransmission request data for requesting retransmission of the packet held to be enabled to be transmitted by the communication device on the transmission side among a plurality of the packets with the retransmission candidate message count.

(2)

The communication device according to (1), in which the retransmission request unit includes a retransmission list holding unit that holds a retransmission list in which the message count newer than the message count oldest of a first buffer that holds the packet transmitted in the communication device on the transmission side is registered, among a plurality of the message counts subjected to the retransmission candidate message count.

(3)

The communication device according to (2), in which the retransmission request unit includes a timing control unit that issues a transmission request for a retransmission request for the packet with the message count registered in the retransmission list, to a transmission and reception scheduler that manages transmission and reception of control data with the communication device on the transmission side via a control channel, at a timing based on the number of queues of a second buffer that holds the packets to be retransmitted in the communication device on the transmission side.

(4)

The communication device according to (3), in which the retransmission request unit includes a retransmission request data generation unit that generates retransmission request data for requesting retransmission of the packet with the message count registered in the retransmission list and supplies the retransmission request data to the transmission and reception scheduler in a case where transmission permission is obtained from the transmission and reception scheduler for the transmission request by the transmission and reception scheduler by the timing control unit.

(5)

The communication device according to (4), in which the retransmission request data generation unit obtains a retransmission frequency indicating a frequency of transmission of the packet to be retransmitted, with respect to transmission of the packet to be newly transmitted from the communication device on the transmission side, on the basis of the number of queues of a third buffer that holds the packet to be newly transmitted in the communication device on the transmission side, and gives the retransmission frequency to the retransmission request data.

(6)

The communication device according to any of (1) to (5), in which
the retransmission detection unit determines whether or not the message count acquired is consecutive, with reception of the message count as a trigger, and detects the retransmission candidate message count on the basis of a determination result.

(7)

The communication device according to any of (1) to (6), in which
the retransmission detection unit determines whether or not the message count acquired is consecutive, with detection of the packet as a trigger, detects the retransmission candidate message count on the basis of a determination result, and sets the packet in which a header error is detected as a candidate for which retransmission is requested.

(8)

A communication process performed by a communication device on a reception side, the communication process including:
acquiring a message count included in a header of a packet transmitted from a communication device on a transmission side via a data channel, and detecting the message count of the packet that is a candidate for which retransmission is requested as a retransmission candidate message count; and
generating retransmission request data for requesting retransmission of the packet held to be enabled to be transmitted by the communication device on the transmission side among a plurality of the packets with the retransmission candidate message count.

(9)

A program causing a computer of a communication device on a reception side to execute a communication process including:
acquiring a message count included in a header of a packet transmitted from a communication device on a transmission side via a data channel, and detecting the message count of the packet that is a candidate for which retransmission is requested as a retransmission candidate message count; and
generating retransmission request data for requesting retransmission of the packet held to be enabled to be transmitted by the communication device on the transmission side among a plurality of the packets with the retransmission candidate message count.

(10)

A communication device including:
a control data identification unit that identifies control data transmitted from a communication device on a reception side via a control channel, and detects retransmission request data specifying a packet for which retransmission is requested among a plurality of the packets transmitted co the communication device on the reception side via a data channel by a message count included in a header of the packet; and
a transmission scheduler that controls switching between transmission of the packet for which retransmission is requested by the retransmission request data and transmission of the packet to be newly transmitted to the communication device on the reception side.

(11)

The communication device according to (10), further including:
a first buffer that holds a transmitted packet transmitted to the communication device on the reception side; and
a second buffer that sets a packet specified by the message count of the retransmission request data as a transmission target, and prohibits overwriting on and holds the packet.

(12)

The communication device according to (11), in which functions as the first buffer and the second buffer are implemented by address management of one buffer.

(13)

The communication device according to (10), in which the transmission scheduler includes a third buffer that holds the packet to be newly transmitted to the communication device on the reception side.

(14)

The communication device according to (10), in which the transmission scheduler controls switching of transmission in accordance with a retransmission frequency that is given to the retransmission request data and indicates a frequency of transmission of the packet to be retransmitted with respect to transmission of the packet to be newly transmitted to the communication device on the reception side.

(15)

A communication process performed by a communication device on a transmission side, the communication process including:
identifying control data transmitted from a communication device on a reception side via a control channel, and detecting retransmission request data specifying a packet for which retransmission is requested among a plurality of the packets transmitted to the communication device on the reception side via a data channel by a message count included in a header of the packet; and
controlling switching between transmission of the packet for which retransmission is requested by the retransmission request data and transmission of the packet to be newly transmitted to the communication device on the reception side.

(16)

A program causing a computer of a communication device on a transmission side to execute a communication process including:
identifying control data transmitted from a communication device on a reception side via a control channel, and detecting retransmission request data specifying a packet for which retransmission is requested among a plurality of the packets transmitted to the communication device on the reception side via a data channel by a message count included in a header of the packet; and controlling switching between transmission of the packet for which retransmission is requested by the retransmission request data and transmission of the packet to be newly transmitted to the communication device on the reception side.

Note that, the present embodiment is not limited to the embodiment described above, and various modifications are possible without departing from the scope of the present disclosure. Furthermore, the advantageous effects described in the present specification are merely examples and are not limited to them, and other effects may be included.

REFERENCE SIGNS LIST

11 Communication system
12 Vehicle
13 Sensor unit
14 Control device
15 Coaxial cable
21 Image sensor
22 Distance sensor
23 Serializer
31 Application processor
32 Deserializer
41 Transmission-side communication device
42 Reception-side communication device
51 Transmitter
52 Receiver
53 Error detection code calculator
54 Error detector
55 Control data identifier
56 Transmitted buffer
57 Transmission scheduler
58 Error detection code calculator
59 Transmitter
61 Transmitter
62 Receiver
63 Error detection code calculator
64 Error detector
65 Transmission and reception scheduler
66 Receiver
67 Error detector
68 Retransmission detector
69 Retransmission controller
71 Retransmission list holding unit
72 Timing control unit
73 Retransmission request data generation unit
81 Write control unit
82 Transfer control unit
83 Read control unit
84 Transmitted packet buffer
85 Retransmission packet buffer
86 Transmitted packet and retransmission packet buffer
91 Sensor data buffer
92 Switching unit
93 Control unit

The invention claimed is:

1. A communication device comprising:
a memory storing instructions; and
an electronic processor configured to execute the instructions to perform a set of operations comprising:
acquiring a first message count included in a header of a first packet transmitted from a communication device on a transmission side via a data channel, wherein a first buffer on the transmission side holds the first packet,
detecting the first message count of the first packet that is a candidate for requesting retransmission as a retransmission candidate message count,
registering, to a retransmission list on a reception side, a message count that is newer than an oldest message count of the first buffer from among a plurality of message counts indicated by the retransmission candidate message count,
deleting, from the retransmission list, message counts that are older than the oldest message count of the first buffer, and
generating retransmission request data for requesting retransmission of the first packet by the communication device on the transmission side from among a plurality of the packets with the retransmission candidate message count.

2. The communication device according to claim 1, wherein the set of operations further comprise:
issuing a transmission request for a retransmission request for the packet with the message count registered in the retransmission list, to a transmission and reception scheduler that manages transmission and reception of control data with the communication device on the transmission side via a control channel, at a timing based on a number of queues of a second buffer that holds the packets to be retransmitted in the communication device on the transmission side.

3. The communication device according to claim 2, wherein the set of operations further comprise:
generating retransmission request data for requesting retransmission of the first packet with the message count registered in the retransmission list and supplying the retransmission request data to the transmission and reception scheduler in a case where transmission permission is obtained from the transmission and reception scheduler for the transmission request.

4. The communication device according to claim 3, wherein the set of operations further comprise:
obtaining a retransmission frequency indicating a frequency of transmission of the first packet to be retransmitted, with respect to transmission of a second packet to be newly transmitted from the communication device on the transmission side, on a basis of a number of queues of a third buffer that holds the second packet to be newly transmitted in the communication device on the transmission side, and gives the retransmission frequency to the retransmission request data.

5. The communication device according to claim 1, wherein the set of operations further comprise:
determining whether or not the message count acquired is consecutive, with reception of the message count as a trigger, and detecting the retransmission candidate message count on a basis of a determination result.

6. The communication device according to claim 1, wherein the set of operations further comprise:
determining whether or not the message count acquired is consecutive, with detection of the packet as a trigger, detecting the retransmission candidate message count on a basis of a determination result, and
setting the packet in which a header error is detected as a candidate for which retransmission is requested.

7. A communication method performed by a communication device on a reception side, the communication method comprising:

acquiring a message count included in a header of a packet transmitted from a communication device on a transmission side via a data channel, wherein a first buffer on the transmission side holds the first packet, and detecting the message count of the packet that is a candidate for which retransmission is requested as a retransmission candidate message count;

registering, to a retransmission list on a reception side, a message count that is newer than an oldest message count of the first buffer from among a plurality of message counts indicated by the retransmission candidate message count;

deleting, from the retransmission list, message counts that are older than the oldest message count of the first buffer; and generating retransmission request data for requesting retransmission of the packet held to be enabled to be transmitted by the communication device on the transmission side from among a plurality of the packets with the retransmission candidate message count.

8. A non-transitory computer readable medium storing a program causing a computer of a communication device on a reception side to execute a communication process including:

acquiring a message count included in a header of a packet transmitted from a communication device on a transmission side via a data channel, wherein a first buffer on the transmission side holds the first packet, and detecting the message count of the packet that is a candidate for which retransmission is requested as a retransmission candidate message count;

registering, to a retransmission list on a reception side, a message count that is newer than an oldest message count of the first buffer from among a plurality of message counts indicated by the retransmission candidate message count;

deleting, from the retransmission list, message counts that are older than the oldest message count of the first buffer; and generating retransmission request data for requesting retransmission of the packet held to be enabled to be transmitted by the communication device on the transmission side from among a plurality of the packets with the retransmission candidate message count.

\* \* \* \* \*